(12) United States Patent
Kostrzewa et al.

(10) Patent No.: US 9,247,131 B2
(45) Date of Patent: Jan. 26, 2016

(54) ALIGNMENT OF VISIBLE LIGHT SOURCES BASED ON THERMAL IMAGES

(71) Applicant: FLIR Systems, Inc., Wilsonville, OR (US)

(72) Inventors: Joseph Kostrzewa, Buellton, CA (US); Shawn Jepson, Goleta, CA (US); Nicholas Högasten, Santa Barbara, CA (US); Theodore R. Hoelter, Goleta, CA (US); Katrin Strandemar, Rimbo (SE)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 14/736,133

(22) Filed: Jun. 10, 2015

(65) Prior Publication Data

US 2015/0365592 A1 Dec. 17, 2015

Related U.S. Application Data

(63) Continuation of application No. 13/802,578, filed on Mar. 13, 2013, now Pat. No. 9,058,653, and a continuation-in-part of application No. PCT/US2012/041744, filed on Jun. 8, 2012, and a continuation-in-part of application No. PCT/US2012/041749, filed on Jun. 8, 2012, and a continuation-in-part of application No. PCT/US2012/041739, filed on Jun. 8, 2012.

(60) Provisional application No. 61/612,131, filed on Mar. 16, 2012, provisional application No. 61/656,889, filed on Jun. 7, 2012, provisional application No. 61/545,056, filed on Oct. 7, 2011, provisional application No. 61/495,873, filed on Jun. 10, 2011, provisional application No. 61/495,879, filed on Jun. 10, 2011, provisional application No. 61/495,888, filed on Jun. 10, 2011.

(51) Int. Cl.
*H04N 5/232* (2006.01)
*H04N 5/33* (2006.01)
*H04N 5/225* (2006.01)

(52) U.S. Cl.
CPC ......... *H04N 5/23229* (2013.01); *H04N 5/2256* (2013.01); *H04N 5/33* (2013.01)

(58) Field of Classification Search
CPC .... H04N 5/23229; H04N 5/33; H04N 5/2256
See application file for complete search history.

(56) References Cited

U.S. PATENT DOCUMENTS

| | | | | |
|---|---|---|---|---|
| 7,616,877 B2 * | 11/2009 | Zarnowski | ............ | G02B 7/028 348/240.3 |
| 2009/0065695 A1 * | 3/2009 | DeMarco | ................. | G01C 3/08 250/330 |

*Primary Examiner* — Mark R Gaworecki
(74) *Attorney, Agent, or Firm* — Haynes and Boone, LLP

(57) ABSTRACT

Various techniques are disclosed for providing systems for providing alignment guide information to selectively direct a visible light source to substantially align the visible light source with a desired subject and to project a visible light beam substantially on the desired subject. For example, a system may include a small form factor infrared imaging module to capture thermal images of a scene, which may be received by a processor to generate alignment guide information such as a user-viewable image of the scene, a user-viewable cue, and a framing reticle. In another example, such a system may be implemented as a camera. In yet another example, such a system may be implemented as a spotlight.

20 Claims, 14 Drawing Sheets

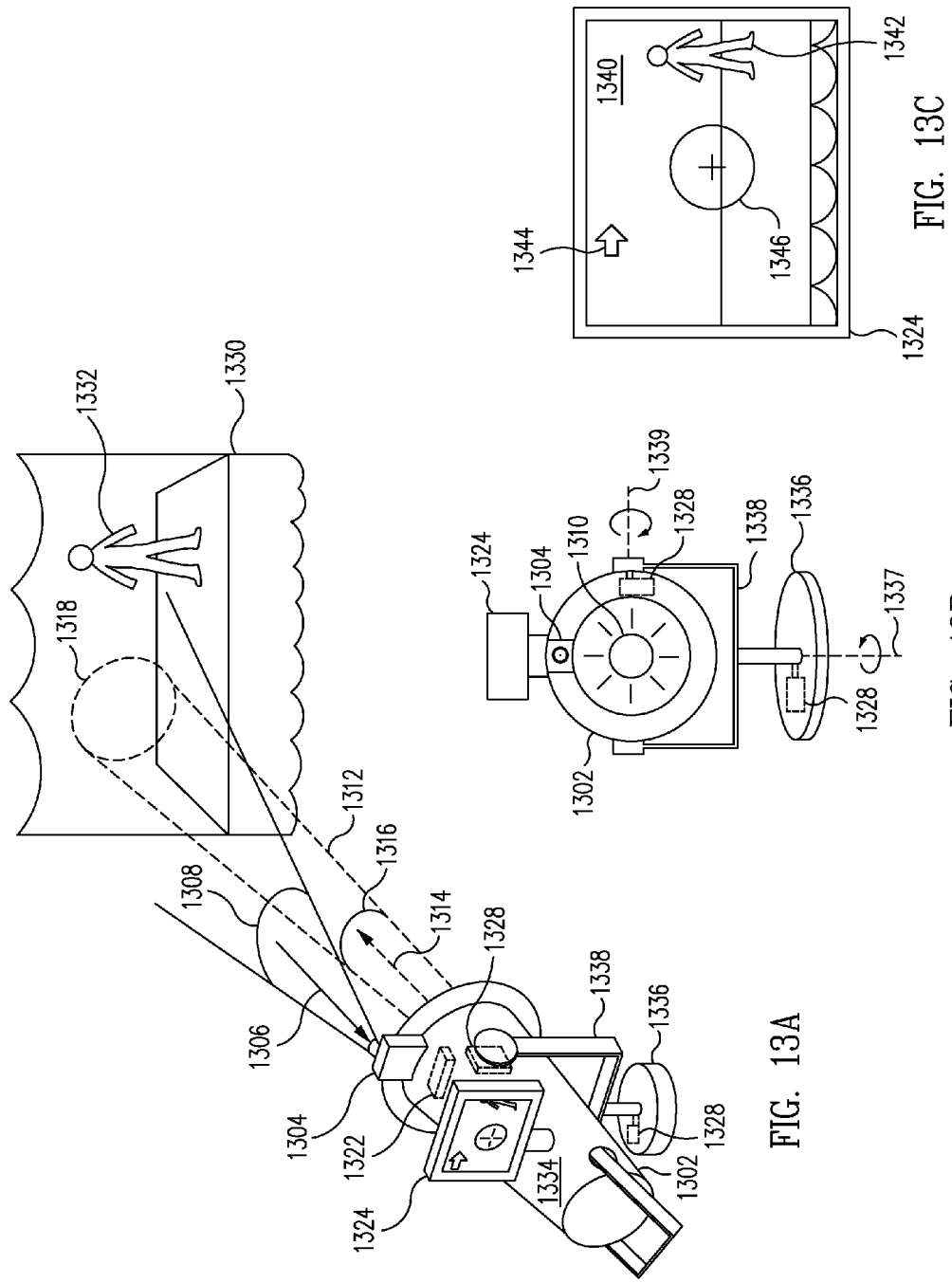

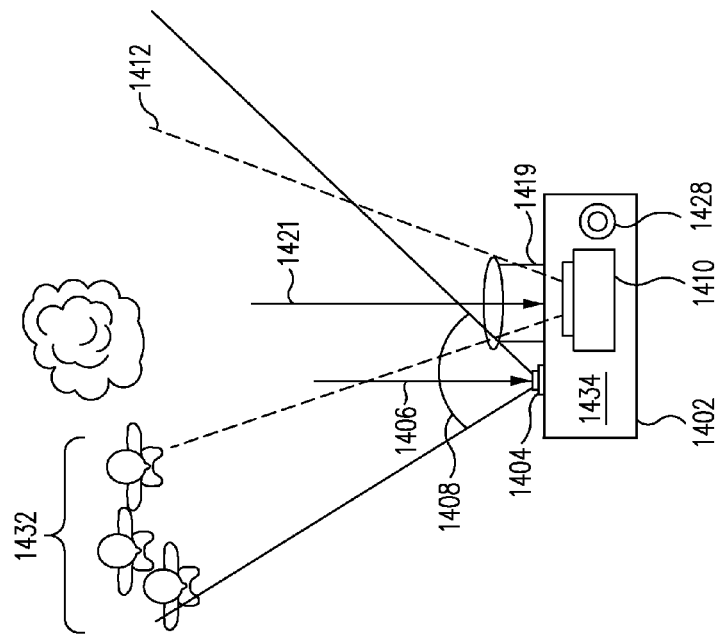
FIG. 14B
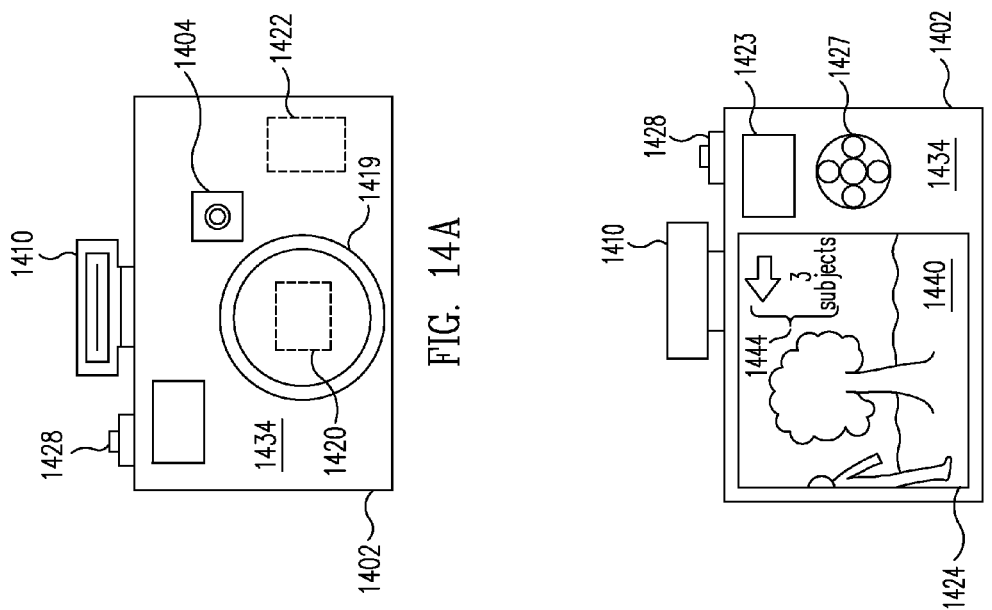
FIG. 14A
FIG. 14C

ALIGNMENT OF VISIBLE LIGHT SOURCES BASED ON THERMAL IMAGES

CROSS-REFERENCE TO RELATED APPLICATIONS

This application is a continuation U.S. patent application Ser. No. 13/802,578 filed Mar. 13, 2013 and entitled "ALIGNMENT OF VISIBLE LIGHT SOURCES BASED ON THERMAL IMAGES" which is hereby incorporated by reference in its entirety.

U.S. patent application Ser. No. 13/802,578 claims the benefit of U.S. Provisional Patent Application No. 61/612,131 filed Mar. 16, 2012 entitled "ALIGNMENT OF VISIBLE LIGHT SOURCES BASED ON THERMAL IMAGES" which is hereby incorporated by reference in its entirety.

U.S. patent application Ser. No. 13/802,578 is a continuation-in-part of International Patent Application No. PCT/US2012/041744 filed Jun. 8, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/656,889 filed Jun. 7, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041744 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041744 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041744 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

U.S. patent application Ser. No. 13/802,578 is a continuation-in-part of International Patent Application No. PCT/US2012/041749 filed Jun. 8, 2012 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041749 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041749 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

U.S. patent application Ser. No. 13/802,578 is a continuation-in-part of International Patent Application No. PCT/US2012/041739 filed Jun. 8, 2012 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041739 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

TECHNICAL FIELD

One or more embodiments of the invention relate generally to thermal imaging devices and more particularly, for example, to the use of thermal images to align visible light sources.

BACKGROUND

In various circumstances, it may be desirable to align a visible light source (e.g., a stage spotlight, a camera flash, or other visible light source) in darkness or low visibility conditions before being turned on. For example, it is often desirable to direct a stage spotlight on an actor standing on a dark stage and/or behind a curtain before the stage spotlight is turned on as an act or play commences. This usually requires the actor to stand at a pre-marked position on stage while a stage spotlight is blindly aimed. Such implementations may be unreliable and subject to human error.

In another example, many photographs are taken in darkness or low light conditions using a flash. However, it may be very difficult to frame a shot as desired. Because there may be too little light for a scene viewed through a viewfinder or on a screen (e.g., a digital camera screen presenting a live view image for framing), the actual framing of the shot may not be sufficiently discernable. Thus, photographers are often forced to take photographs blindly which may be result in poor timing and/or framing of such photographs.

These and other circumstances often limit or compromise the ability to direct visible light sources on desired subjects in darkness or low visibility conditions.

SUMMARY

Various techniques are disclosed for providing systems for providing alignment guide information to selectively direct a visible light source to substantially align the visible light source with a desired subject and to project a visible light beam substantially on the desired subject. For example, a system may include a small form factor infrared imaging module to capture thermal images of a scene, which may be received by a processor to generate alignment guide information such as a user-viewable image of the scene, a user-viewable cue, and a framing reticle. In another example, such a system may be implemented as a camera. In yet another example, such a system may be implemented as a spotlight.

In one embodiment, a system includes an infrared imaging module comprising a focal plane array (FPA) configured to capture an unblurred thermal image of a scene and an intentionally blurred image of the scene; a processor configured to determine a plurality of non-uniform correction (NUC) terms based on the intentionally blurred thermal image, apply the NUC terms to the unblurred thermal image to remove noise form the unblurred thermal image, and generate alignment guide information from the unblurred thermal image; and a visible light source configured to be selectively directed based on the alignment guide information to substantially align the visible light source with a desired subject and project a visible light beam substantially on the subject.

In another embodiment, a method of operating a system includes capturing an unblurred thermal image of a scene and an intentionally blurred image of the scene at a focal plane array (FPA) of an infrared imaging module; determining a plurality of non-uniform correction (NUC) terms based on the intentionally blurred thermal image; applying the NUC terms to the unblurred thermal image to remove noise form the unblurred thermal image; generating, from the unblurred thermal image, alignment guide information; receiving a force to selectively direct a visible light source to substantially align the visible light source with a desired subject based on the alignment guide information; and projecting a visible light beam from the visible light source substantially on the subject while the visible light source is aligned based on the alignment guide information.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 13A-C illustrate various views of a spotlight system having an infrared imaging module used to align a visible light source in accordance with embodiments of the disclosure.

FIGS. 14A-C illustrate various views of a camera system having an infrared imaging module used to align a flash in accordance with embodiments of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
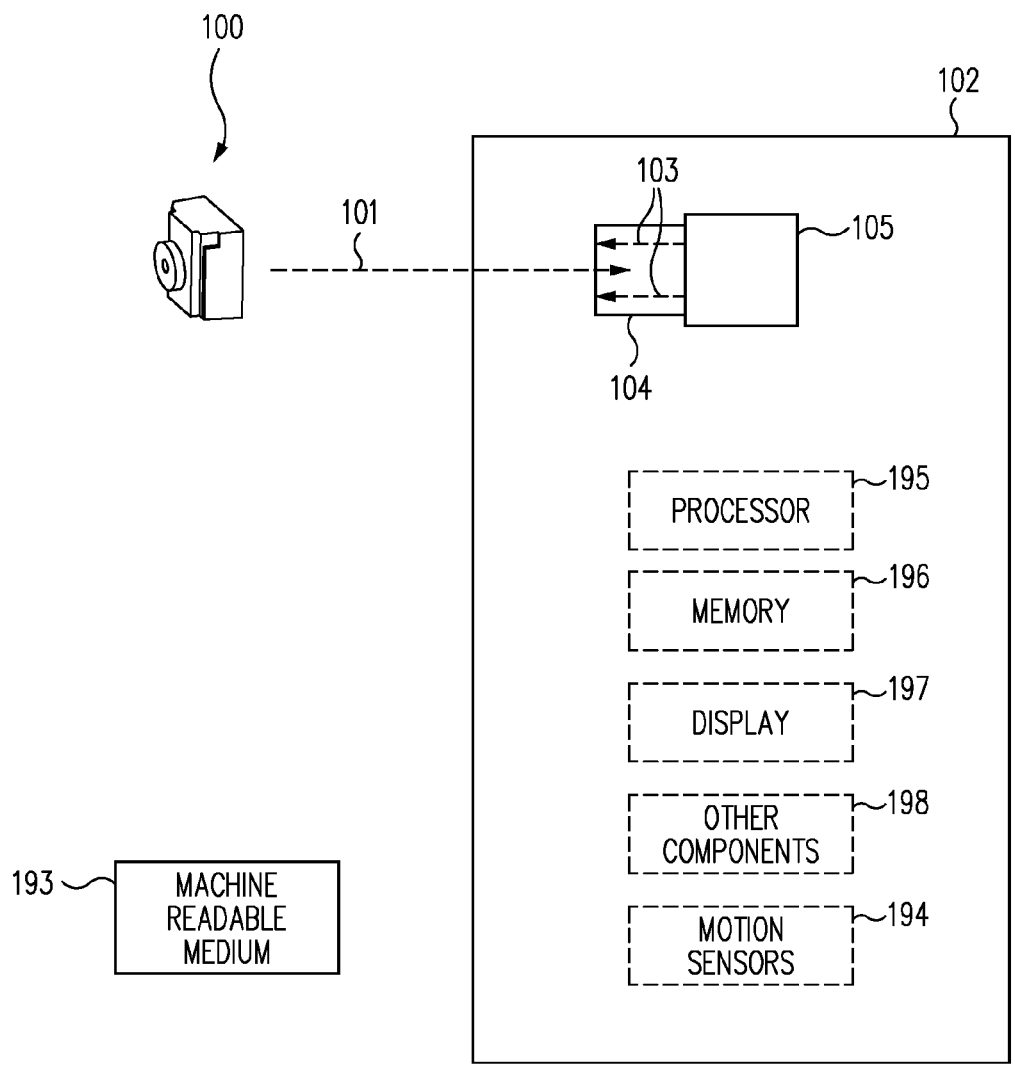
FIG. 1 illustrates an infrared imaging module configured to be implemented in a host device in accordance with an embodiment of the disclosure.

FIG. 1 illustrates an infrared imaging module 100 (e.g., an infrared camera or an infrared imaging device) configured to be implemented in a host device 102 in accordance with an embodiment of the disclosure. Infrared imaging module 100 may be implemented, for one or more embodiments, with a small form factor and in accordance with wafer level packaging techniques or other packaging techniques.

In one embodiment, infrared imaging module 100 may be configured to be implemented in a small portable host device 102, such as a mobile telephone, a tablet computing device, a laptop computing device, a personal digital assistant, a visible light camera, a music player, or any other appropriate mobile device. In this regard, infrared imaging module 100 may be used to provide infrared imaging features to host device 102. For example, infrared imaging module 100 may be configured to capture, process, and/or otherwise manage infrared images and provide such infrared images to host device 102 for use in any desired fashion (e.g., for further processing, to store in memory, to display, to use by various applications running on host device 102, to export to other devices, or other uses).

In various embodiments, infrared imaging module 100 may be configured to operate at low voltage levels and over a wide temperature range. For example, in one embodiment, infrared imaging module 100 may operate using a power supply of approximately 2.4 volts, 2.5 volts, 2.8 volts, or lower voltages, and operate over a temperature range of approximately −20 degrees C. to approximately +60 degrees C. (e.g., providing a suitable dynamic range and performance over an environmental temperature range of approximately 80 degrees C.). In one embodiment, by operating infrared imaging module 100 at low voltage levels, infrared imaging module 100 may experience reduced amounts of self heating in comparison with other types of infrared imaging devices.

As a result, infrared imaging module 100 may be operated with reduced measures to compensate for such self heating.

Figure 2:
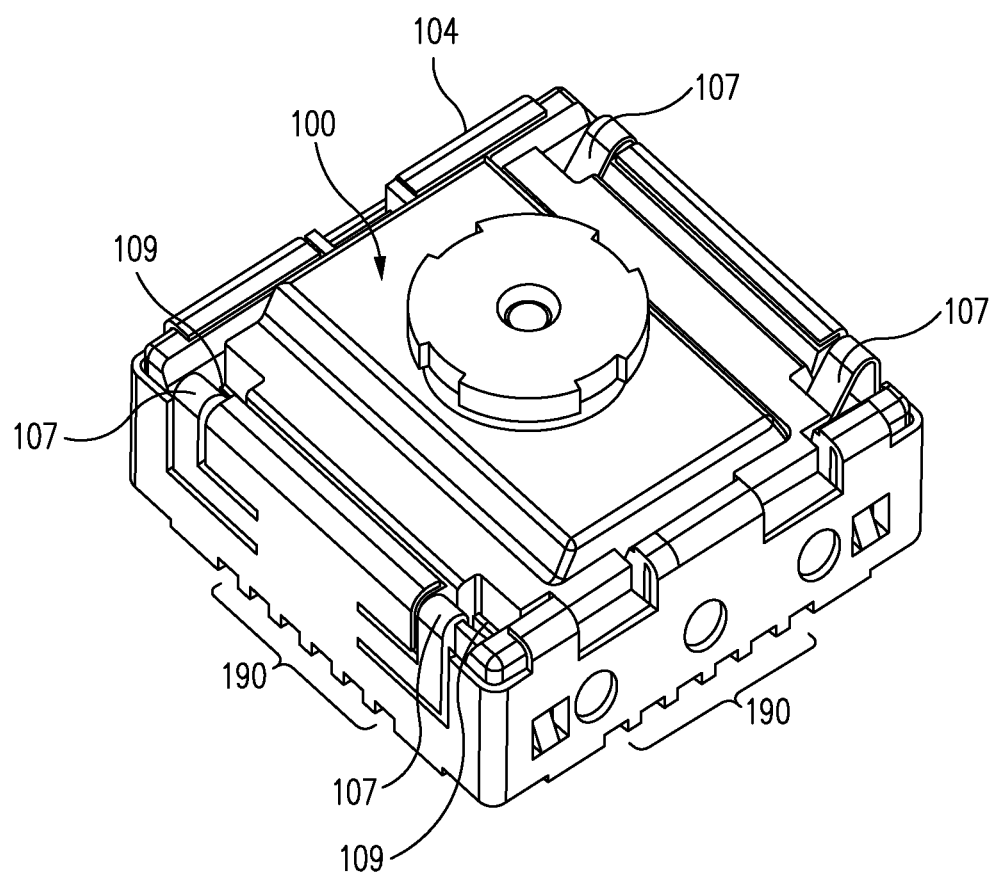
FIG. 2 illustrates an assembled infrared imaging module in accordance with an embodiment of the disclosure.

As shown in FIG. 1, host device 102 may include a socket 104, a shutter 105, motion sensors 194, a processor 195, a memory 196, a display 197, and/or other components 198. Socket 104 may be configured to receive infrared imaging module 100 as identified by arrow 101. In this regard, FIG. 2 illustrates infrared imaging module 100 assembled in socket 104 in accordance with an embodiment of the disclosure.

Motion sensors 194 may be implemented by one or more accelerometers, gyroscopes, or other appropriate devices that may be used to detect movement of host device 102. Motion sensors 194 may be monitored by and provide information to processing module 160 or processor 195 to detect motion. In various embodiments, motion sensors 194 may be implemented as part of host device 102 (as shown in FIG. 1), infrared imaging module 100, or other devices attached to or otherwise interfaced with host device 102.

Processor 195 may be implemented as any appropriate processing device (e.g., logic device, microcontroller, processor, application specific integrated circuit (ASIC), or other device) that may be used by host device 102 to execute appropriate instructions, such as software instructions provided in memory 196. Display 197 may be used to display captured and/or processed infrared images and/or other images, data, and information. Other components 198 may be used to implement any features of host device 102 as may be desired for various applications (e.g., clocks, temperature sensors, a visible light camera, or other components). In addition, a machine readable medium 193 may be provided for storing non-transitory instructions for loading into memory 196 and execution by processor 195.

In various embodiments, infrared imaging module 100 and socket 104 may be implemented for mass production to facilitate high volume applications, such as for implementation in mobile telephones or other devices (e.g., requiring small form factors). In one embodiment, the combination of infrared imaging module 100 and socket 104 may exhibit overall dimensions of approximately 8.5 mm by 8.5 mm by 5.9 mm while infrared imaging module 100 is installed in socket 104.

Figure 3:
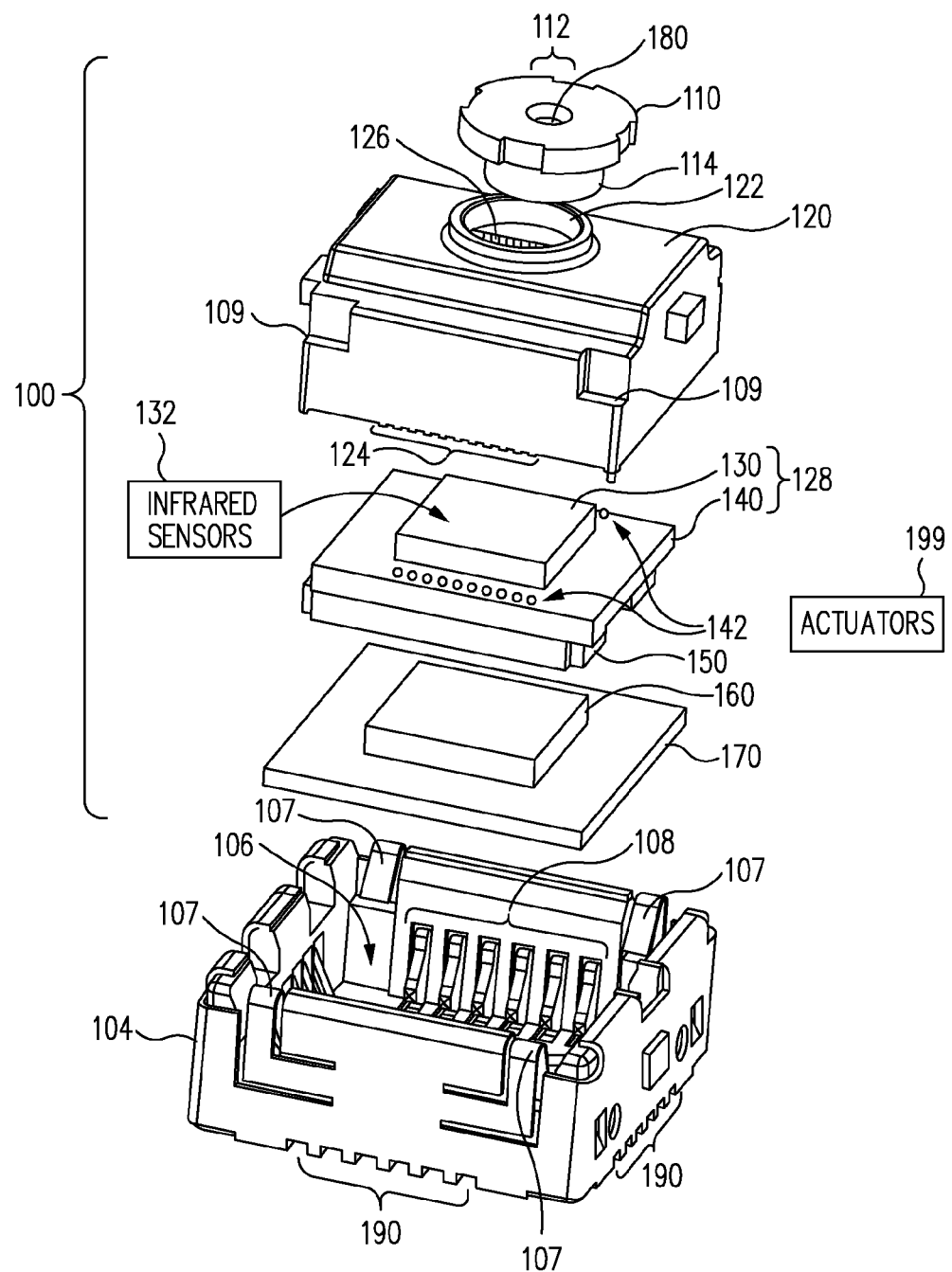
FIG. 3 illustrates an exploded view of an infrared imaging module juxtaposed over a socket in accordance with an embodiment of the disclosure.

FIG. 3 illustrates an exploded view of infrared imaging module 100 juxtaposed over socket 104 in accordance with an embodiment of the disclosure. Infrared imaging module 100 may include a lens barrel 110, a housing 120, an infrared sensor assembly 128, a circuit board 170, a base 150, and a processing module 160.

Lens barrel 110 may at least partially enclose an optical element 180 (e.g., a lens) which is partially visible in FIG. 3 through an aperture 112 in lens barrel 110. Lens barrel 110 may include a substantially cylindrical extension 114 which may be used to interface lens barrel 110 with an aperture 122 in housing 120.

Infrared sensor assembly 128 may be implemented, for example, with a cap 130 (e.g., a lid) mounted on a substrate 140. Infrared sensor assembly 128 may include a plurality of infrared sensors 132 (e.g., infrared detectors) implemented in an array or other fashion on substrate 140 and covered by cap 130. For example, in one embodiment, infrared sensor assembly 128 may be implemented as a focal plane array (FPA). Such a focal plane array may be implemented, for example, as a vacuum package assembly (e.g., sealed by cap 130 and substrate 140). In one embodiment, infrared sensor assembly 128 may be implemented as a wafer level package (e.g., infrared sensor assembly 128 may be singulated from a set of vacuum package assemblies provided on a wafer). In one embodiment, infrared sensor assembly 128 may be implemented to operate using a power supply of approximately 2.4 volts, 2.5 volts, 2.8 volts, or similar voltages.

Infrared sensors 132 may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. In one embodiment, infrared sensor assembly 128 may be provided in accordance with wafer level packaging techniques.

Infrared sensors 132 may be implemented, for example, as microbolometers or other types of thermal imaging infrared sensors arranged in any desired array pattern to provide a plurality of pixels. In one embodiment, infrared sensors 132 may be implemented as vanadium oxide (VOx) detectors with a 17 μm pixel pitch. In various embodiments, arrays of approximately 32 by 32 infrared sensors 132, approximately 64 by 64 infrared sensors 132, approximately 80 by 64 infrared sensors 132, or other array sizes may be used.

Substrate 140 may include various circuitry including, for example, a read out integrated circuit (ROIC) with dimensions less than approximately 5.5 mm by 5.5 mm in one embodiment. Substrate 140 may also include bond pads 142 that may be used to contact complementary connections positioned on inside surfaces of housing 120 when infrared imaging module 100 is assembled as shown in FIG. 3. In one embodiment, the ROIC may be implemented with low-dropout regulators (LDO) to perform voltage regulation to reduce power supply noise introduced to infrared sensor assembly 128 and thus provide an improved power supply rejection ratio (PSRR). Moreover, by implementing the LDO with the ROIC (e.g., within a wafer level package), less die area may be consumed and fewer discrete die (or chips) are needed.

Figure 4:
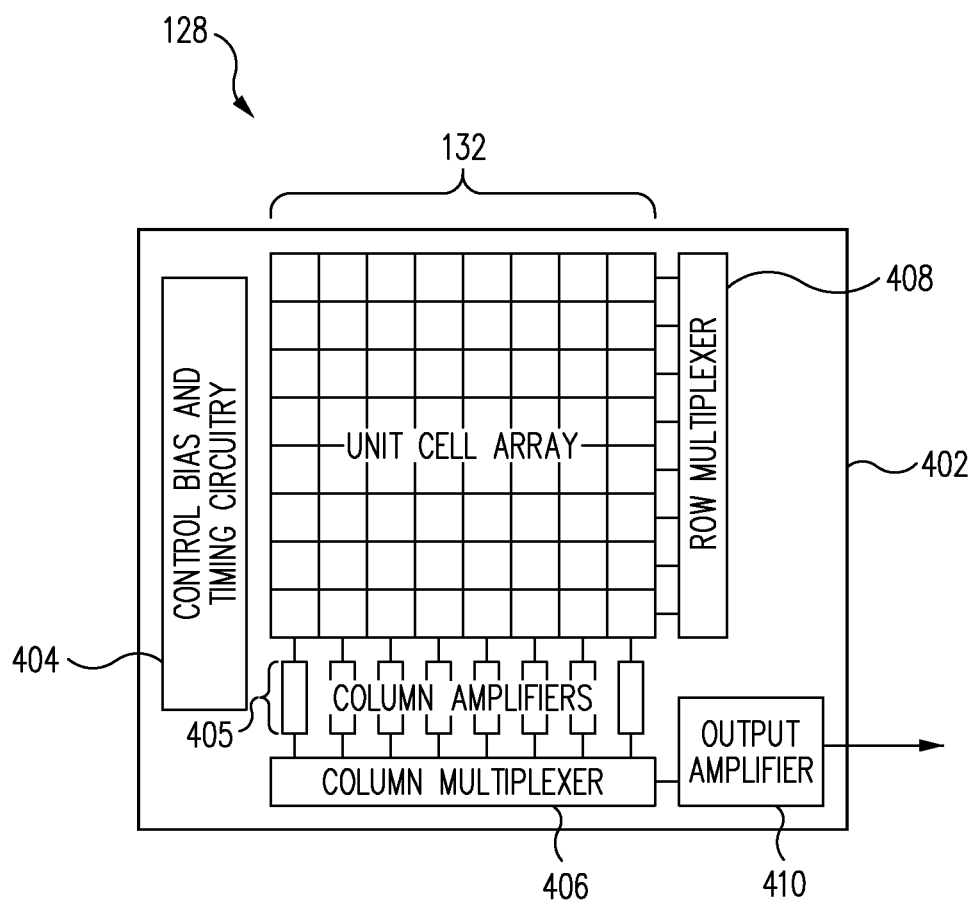
FIG. 4 illustrates a block diagram of an infrared sensor assembly including an array of infrared sensors in accordance with an embodiment of the disclosure.

FIG. 4 illustrates a block diagram of infrared sensor assembly 128 including an array of infrared sensors 132 in accordance with an embodiment of the disclosure. In the illustrated embodiment, infrared sensors 132 are provided as part of a unit cell array of a ROIC 402. ROIC 402 includes bias generation and timing control circuitry 404, column amplifiers 405, a column multiplexer 406, a row multiplexer 408, and an output amplifier 410. Image frames (e.g., thermal images) captured by infrared sensors 132 may be provided by output amplifier 410 to processing module 160, processor 195, and/or any other appropriate components to perform various processing techniques described herein. Although an 8 by 8 array is shown in FIG. 4, any desired array configuration may be used in other embodiments. Further descriptions of ROICs and infrared sensors (e.g., microbolometer circuits) may be found in U.S. Pat. No. 6,028,309 issued Feb. 22, 2000, which is incorporated herein by reference in its entirety.

Infrared sensor assembly 128 may capture images (e.g., image frames) and provide such images from its ROIC at various rates. Processing module 160 may be used to perform appropriate processing of captured infrared images and may be implemented in accordance with any appropriate architecture. In one embodiment, processing module 160 may be implemented as an ASIC. In this regard, such an ASIC may be configured to perform image processing with high performance and/or high efficiency. In another embodiment, processing module 160 may be implemented with a general purpose central processing unit (CPU) which may be configured to execute appropriate software instructions to perform image processing, coordinate and perform image processing with various image processing blocks, coordinate interfacing between processing module 160 and host device 102, and/or other operations. In yet another embodiment, processing module 160 may be implemented with a field programmable gate array (FPGA). Processing module 160 may be implemented with other types of processing and/or logic circuits in other embodiments as would be understood by one skilled in the art.

In these and other embodiments, processing module 160 may also be implemented with other components where appropriate, such as, volatile memory, non-volatile memory, and/or one or more interfaces (e.g., infrared detector interfaces, inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces).

In some embodiments, infrared imaging module 100 may further include one or more actuators 199 which may be used to adjust the focus of infrared image frames captured by infrared sensor assembly 128. For example, actuators 199 may be used to move optical element 180, infrared sensors 132, and/or other components relative to each other to selectively focus and defocus infrared image frames in accordance with techniques described herein. Actuators 199 may be implemented in accordance with any type of motion-inducing apparatus or mechanism, and may positioned at any location within or external to infrared imaging module 100 as appropriate for different applications.

When infrared imaging module 100 is assembled, housing 120 may substantially enclose infrared sensor assembly 128, base 150, and processing module 160. Housing 120 may facilitate connection of various components of infrared imaging module 100. For example, in one embodiment, housing 120 may provide electrical connections 126 to connect various components as further described.

Electrical connections 126 (e.g., conductive electrical paths, traces, or other types of connections) may be electrically connected with bond pads 142 when infrared imaging module 100 is assembled. In various embodiments, electrical connections 126 may be embedded in housing 120, provided on inside surfaces of housing 120, and/or otherwise provided by housing 120. Electrical connections 126 may terminate in connections 124 protruding from the bottom surface of housing 120 as shown in FIG. 3. Connections 124 may connect with circuit board 170 when infrared imaging module 100 is assembled (e.g., housing 120 may rest atop circuit board 170 in various embodiments). Processing module 160 may be electrically connected with circuit board 170 through appropriate electrical connections. As a result, infrared sensor assembly 128 may be electrically connected with processing module 160 through, for example, conductive electrical paths provided by: bond pads 142, complementary connections on inside surfaces of housing 120, electrical connections 126 of housing 120, connections 124, and circuit board 170. Advantageously, such an arrangement may be implemented without requiring wire bonds to be provided between infrared sensor assembly 128 and processing module 160.

In various embodiments, electrical connections 126 in housing 120 may be made from any desired material (e.g., copper or any other appropriate conductive material). In one embodiment, electrical connections 126 may aid in dissipating heat from infrared imaging module 100.

Other connections may be used in other embodiments. For example, in one embodiment, sensor assembly 128 may be attached to processing module 160 through a ceramic board that connects to sensor assembly 128 by wire bonds and to processing module 160 by a ball grid array (BGA). In another embodiment, sensor assembly 128 may be mounted directly on a rigid flexible board and electrically connected with wire bonds, and processing module 160 may be mounted and connected to the rigid flexible board with wire bonds or a BGA.

The various implementations of infrared imaging module 100 and host device 102 set forth herein are provided for purposes of example, rather than limitation. In this regard, any of the various techniques described herein may be applied to any infrared camera system, infrared imager, or other device for performing infrared/thermal imaging.

Substrate 140 of infrared sensor assembly 128 may be mounted on base 150. In various embodiments, base 150 (e.g., a pedestal) may be made, for example, of copper formed by metal injection molding (MIM) and provided with a black oxide or nickel-coated finish. In various embodiments, base 150 may be made of any desired material, such as for example zinc, aluminum, or magnesium, as desired for a given application and may be formed by any desired applicable process, such as for example aluminum casting, MIM, or zinc rapid casting, as may be desired for particular applications. In various embodiments, base 150 may be implemented to provide structural support, various circuit paths, thermal heat sink properties, and other features where appropriate. In one embodiment, base 150 may be a multi-layer structure implemented at least in part using ceramic material.

In various embodiments, circuit board 170 may receive housing 120 and thus may physically support the various components of infrared imaging module 100. In various embodiments, circuit board 170 may be implemented as a printed circuit board (e.g., an FR4 circuit board or other types of circuit boards), a rigid or flexible interconnect (e.g., tape or other type of interconnects), a flexible circuit substrate, a flexible plastic substrate, or other appropriate structures. In various embodiments, base 150 may be implemented with the various features and attributes described for circuit board 170, and vice versa.

Socket 104 may include a cavity 106 configured to receive infrared imaging module 100 (e.g., as shown in the assembled view of FIG. 2). Infrared imaging module 100 and/or socket 104 may include appropriate tabs, arms, pins, fasteners, or any other appropriate engagement members which may be used to secure infrared imaging module 100 to or within socket 104 using friction, tension, adhesion, and/or any other appropriate manner. Socket 104 may include engagement members 107 that may engage surfaces 109 of housing 120 when infrared imaging module 100 is inserted into a cavity 106 of socket 104. Other types of engagement members may be used in other embodiments.

Infrared imaging module 100 may be electrically connected with socket 104 through appropriate electrical connections (e.g., contacts, pins, wires, or any other appropriate connections). For example, socket 104 may include electrical connections 108 which may contact corresponding electrical connections of infrared imaging module 100 (e.g., interconnect pads, contacts, or other electrical connections on side or bottom surfaces of circuit board 170, bond pads 142 or other electrical connections on base 150, or other connections). Electrical connections 108 may be made from any desired material (e.g., copper or any other appropriate conductive material). In one embodiment, electrical connections 108 may be mechanically biased to press against electrical connections of infrared imaging module 100 when infrared imaging module 100 is inserted into cavity 106 of socket 104. In one embodiment, electrical connections 108 may at least partially secure infrared imaging module 100 in socket 104. Other types of electrical connections may be used in other embodiments.

Socket 104 may be electrically connected with host device 102 through similar types of electrical connections. For example, in one embodiment, host device 102 may include electrical connections (e.g., soldered connections, snap-in connections, or other connections) that connect with electrical connections 108 passing through apertures 190. In various embodiments, such electrical connections may be made to the sides and/or bottom of socket 104.

Various components of infrared imaging module 100 may be implemented with flip chip technology which may be used to mount components directly to circuit boards without the additional clearances typically needed for wire bond connections. Flip chip connections may be used, as an example, to reduce the overall size of infrared imaging module 100 for use in compact small form factor applications. For example, in one embodiment, processing module 160 may be mounted to circuit board 170 using flip chip connections. For example, infrared imaging module 100 may be implemented with such flip chip configurations.

In various embodiments, infrared imaging module 100 and/or associated components may be implemented in accordance with various techniques (e.g., wafer level packaging techniques) as set forth in U.S. patent application Ser. No. 12/844,124 filed Jul. 27, 2010, and U.S. Provisional Patent Application No. 61/469,651 filed Mar. 30, 2011, which are incorporated herein by reference in their entirety. Furthermore, in accordance with one or more embodiments, infrared imaging module 100 and/or associated components may be implemented, calibrated, tested, and/or used in accordance with various techniques, such as for example as set forth in U.S. Pat. No. 7,470,902 issued Dec. 30, 2008, U.S. Pat. No. 6,028,309 issued Feb. 22, 2000, U.S. Pat. No. 6,812,465 issued Nov. 2, 2004, U.S. Pat. No. 7,034,301 issued Apr. 25, 2006, U.S. Pat. No. 7,679,048 issued Mar. 16, 2010, U.S. Pat. No. 7,470,904 issued Dec. 30, 2008, U.S. patent application Ser. No. 12/202,880 filed Sep. 2, 2008, and U.S. patent application Ser. No. 12/202,896 filed Sep. 2, 2008, which are incorporated herein by reference in their entirety.

Referring again to FIG. 1, in various embodiments, host device 102 may include shutter 105. In this regard, shutter 105 may be selectively positioned over socket 104 (e.g., as identified by arrows 103) while infrared imaging module 100 is installed therein. In this regard, shutter 105 may be used, for example, to protect infrared imaging module 100 when not in use. Shutter 105 may also be used as a temperature reference as part of a calibration process (e.g., a NUC process or other calibration processes) for infrared imaging module 100 as would be understood by one skilled in the art.

In various embodiments, shutter 105 may be made from various materials such as, for example, polymers, glass, aluminum (e.g., painted or anodized) or other materials. In various embodiments, shutter 105 may include one or more coatings to selectively filter electromagnetic radiation and/or adjust various optical properties of shutter 105 (e.g., a uniform blackbody coating or a reflective gold coating).

In another embodiment, shutter 105 may be fixed in place to protect infrared imaging module 100 at all times. In this case, shutter 105 or a portion of shutter 105 may be made from appropriate materials (e.g., polymers or infrared transmitting materials such as silicon, germanium, zinc selenide, or chalcogenide glasses) that do not substantially filter desired infrared wavelengths. In another embodiment, a shutter may be implemented as part of infrared imaging module 100 (e.g., within or as part of a lens barrel or other components of infrared imaging module 100), as would be understood by one skilled in the art.

Alternatively, in another embodiment, a shutter (e.g., shutter 105 or other type of external or internal shutter) need not be provided, but rather a NUC process or other type of calibration may be performed using shutterless techniques. In another embodiment, a NUC process or other type of calibration using shutterless techniques may be performed in combination with shutter-based techniques.

Infrared imaging module 100 and host device 102 may be implemented in accordance with any of the various techniques set forth in U.S. Provisional Patent Application No. 61/495,873 filed Jun. 10, 2011, U.S. Provisional Patent Application No. 61/495,879 filed Jun. 10, 2011, and U.S. Provisional Patent Application No. 61/495,888 filed Jun. 10, 2011, which are incorporated herein by reference in their entirety.

In various embodiments, the components of host device 102 and/or infrared imaging module 100 may be implemented as a local or distributed system with components in communication with each other over wired and/or wireless networks. Accordingly, the various operations identified in this disclosure may be performed by local and/or remote components as may be desired in particular implementations.

Figure 5:
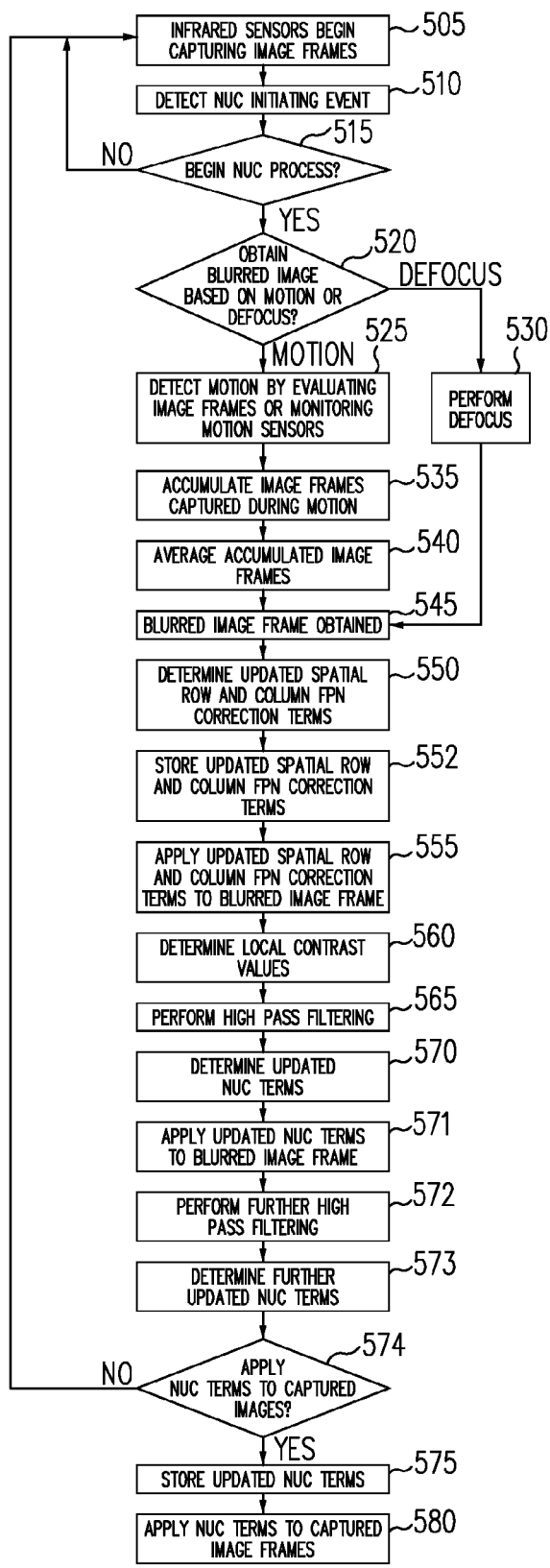
FIG. 5 illustrates a flow diagram of various operations to determine non-uniformity correction (NUC) terms in accordance with an embodiment of the disclosure.

FIG. 5 illustrates a flow diagram of various operations to determine NUC terms in accordance with an embodiment of the disclosure. In some embodiments, the operations of FIG. 5 may be performed by processing module 160 or processor 195 (both also generally referred to as a processor) operating on image frames captured by infrared sensors 132.

In block 505, infrared sensors 132 begin capturing image frames of a scene. Typically, the scene will be the real world environment in which host device 102 is currently located. In this regard, shutter 105 (if optionally provided) may be opened to permit infrared imaging module to receive infrared radiation from the scene. Infrared sensors 132 may continue capturing image frames during all operations shown in FIG. 5. In this regard, the continuously captured image frames may be used for various operations as further discussed. In one embodiment, the captured image frames may be temporally filtered (e.g., in accordance with the process of block 826 further described herein with regard to FIG. 8) and be processed by other terms (e.g., factory gain terms 812, factory offset terms 816, previously determined NUC terms 817, column FPN terms 820, and row FPN terms 824 as further described herein with regard to FIG. 8) before they are used in the operations shown in FIG. 5.

In block 510, a NUC process initiating event is detected. In one embodiment, the NUC process may be initiated in response to physical movement of host device 102. Such movement may be detected, for example, by motion sensors 194 which may be polled by a processor. In one example, a user may move host device 102 in a particular manner, such as by intentionally waving host device 102 back and forth in an "erase" or "swipe" movement. In this regard, the user may move host device 102 in accordance with a predetermined speed and direction (velocity), such as in an up and down, side to side, or other pattern to initiate the NUC process. In this example, the use of such movements may permit the user to intuitively operate host device 102 to simulate the "erasing" of noise in captured image frames.

In another example, a NUC process may be initiated by host device 102 if motion exceeding a threshold value is detected (e.g., motion greater than expected for ordinary use). It is contemplated that any desired type of spatial translation of host device 102 may be used to initiate the NUC process.

In yet another example, a NUC process may be initiated by host device 102 if a minimum time has elapsed since a previously performed NUC process. In a further example, a NUC process may be initiated by host device 102 if infrared imaging module 100 has experienced a minimum temperature change since a previously performed NUC process. In a still further example, a NUC process may be continuously initiated and repeated.

In block 515, after a NUC process initiating event is detected, it is determined whether the NUC process should actually be performed. In this regard, the NUC process may be selectively initiated based on whether one or more additional conditions are met. For example, in one embodiment, the NUC process may not be performed unless a minimum time has elapsed since a previously performed NUC process. In another embodiment, the NUC process may not be performed unless infrared imaging module 100 has experienced a minimum temperature change since a previously performed NUC process. Other criteria or conditions may be used in other embodiments. If appropriate criteria or conditions have been met, then the flow diagram continues to block 520. Otherwise, the flow diagram returns to block 505.

In the NUC process, blurred image frames may be used to determine NUC terms which may be applied to captured image frames to correct for FPN. As discussed, in one embodiment, the blurred image frames may be obtained by accumulating multiple image frames of a moving scene (e.g., captured while the scene and/or the thermal imager is in motion). In another embodiment, the blurred image frames may be obtained by defocusing an optical element or other component of the thermal imager.

Accordingly, in block 520 a choice of either approach is provided. If the motion-based approach is used, then the flow diagram continues to block 525. If the defocus-based approach is used, then the flow diagram continues to block 530.

Referring now to the motion-based approach, in block 525 motion is detected. For example, in one embodiment, motion may be detected based on the image frames captured by infrared sensors 132. In this regard, an appropriate motion detection process (e.g., an image registration process, a frame-to-frame difference calculation, or other appropriate process) may be applied to captured image frames to determine whether motion is present (e.g., whether static or moving image frames have been captured). For example, in one embodiment, it can be determined whether pixels or regions around the pixels of consecutive image frames have changed more than a user defined amount (e.g., a percentage and/or threshold value). If at least a given percentage of pixels have changed by at least the user defined amount, then motion will be detected with sufficient certainty to proceed to block 535.

In another embodiment, motion may be determined on a per pixel basis, wherein only pixels that exhibit significant changes are accumulated to provide the blurred image frame. For example, counters may be provided for each pixel and used to ensure that the same number of pixel values are accumulated for each pixel, or used to average the pixel values based on the number of pixel values actually accumulated for each pixel. Other types of image-based motion detection may be performed such as performing a Radon transform.

In another embodiment, motion may be detected based on data provided by motion sensors 194. In one embodiment, such motion detection may include detecting whether host device 102 is moving along a relatively straight trajectory through space. For example, if host device 102 is moving along a relatively straight trajectory, then it is possible that certain objects appearing in the imaged scene may not be sufficiently blurred (e.g., objects in the scene that may be aligned with or moving substantially parallel to the straight trajectory). Thus, in such an embodiment, the motion detected by motion sensors 194 may be conditioned on host device 102 exhibiting, or not exhibiting, particular trajectories.

In yet another embodiment, both a motion detection process and motion sensors 194 may be used. Thus, using any of these various embodiments, a determination can be made as to whether or not each image frame was captured while at least a portion of the scene and host device 102 were in motion relative to each other (e.g., which may be caused by host device 102 moving relative to the scene, at least a portion of the scene moving relative to host device 102, or both).

It is expected that the image frames for which motion was detected may exhibit some secondary blurring of the captured scene (e.g., blurred thermal image data associated with the scene) due to the thermal time constants of infrared sensors 132 (e.g., microbolometer thermal time constants) interacting with the scene movement.

In block 535, image frames for which motion was detected are accumulated. For example, if motion is detected for a continuous series of image frames, then the image frames of the series may be accumulated. As another example, if motion is detected for only some image frames, then the non-moving image frames may be skipped and not included in the accumulation. Thus, a continuous or discontinuous set of image frames may be selected to be accumulated based on the detected motion.

In block 540, the accumulated image frames are averaged to provide a blurred image frame. Because the accumulated image frames were captured during motion, it is expected that actual scene information will vary between the image frames and thus cause the scene information to be further blurred in the resulting blurred image frame (block 545).

In contrast, FPN (e.g., caused by one or more components of infrared imaging module 100) will remain fixed over at least short periods of time and over at least limited changes in scene irradiance during motion. As a result, image frames captured in close proximity in time and space during motion will suffer from identical or at least very similar FPN. Thus, although scene information may change in consecutive image frames, the FPN will stay essentially constant. By averaging, multiple image frames captured during motion will blur the scene information, but will not blur the FPN. As a result, FPN will remain more clearly defined in the blurred image frame provided in block 545 than the scene information.

In one embodiment, 32 or more image frames are accumulated and averaged in blocks 535 and 540. However, any desired number of image frames may be used in other embodiments, but with generally decreasing correction accuracy as frame count is decreased.

Referring now to the defocus-based approach, in block 530, a defocus operation may be performed to intentionally defocus the image frames captured by infrared sensors 132. For example, in one embodiment, one or more actuators 199 may be used to adjust, move, or otherwise translate optical element 180, infrared sensor assembly 128, and/or other components of infrared imaging module 100 to cause infrared sensors 132 to capture a blurred (e.g., unfocused) image frame of the scene. Other non-actuator based techniques are also contemplated for intentionally defocusing infrared image frames such as, for example, manual (e.g., user-initiated) defocusing.

Although the scene may appear blurred in the image frame, FPN (e.g., caused by one or more components of infrared imaging module 100) will remain unaffected by the defocusing operation. As a result, a blurred image frame of the scene will be provided (block 545) with FPN remaining more clearly defined in the blurred image than the scene information.

In the above discussion, the defocus-based approach has been described with regard to a single captured image frame. In another embodiment, the defocus-based approach may include accumulating multiple image frames while the infrared imaging module 100 has been defocused and averaging the defocused image frames to remove the effects of temporal noise and provide a blurred image frame in block 545.

Thus, it will be appreciated that a blurred image frame may be provided in block 545 by either the motion-based approach or the defocus-based approach. Because much of the scene information will be blurred by either motion, defocusing, or both, the blurred image frame may be effectively considered a low pass filtered version of the original captured image frames with respect to scene information.

In block 550, the blurred image frame is processed to determine updated row and column FPN terms (e.g., if row and column FPN terms have not been previously determined then the updated row and column FPN terms may be new row and column FPN terms in the first iteration of block 550). As used in this disclosure, the terms row and column may be used interchangeably depending on the orientation of infrared sensors 132 and/or other components of infrared imaging module 100.

In one embodiment, block 550 includes determining a spatial FPN correction term for each row of the blurred image frame (e.g., each row may have its own spatial FPN correction term), and also determining a spatial FPN correction term for each column of the blurred image frame (e.g., each column may have its own spatial FPN correction term). Such processing may be used to reduce the spatial and slowly varying (1/f) row and column FPN inherent in thermal imagers caused by, for example, 1/f noise characteristics of amplifiers in ROIC 402 which may manifest as vertical and horizontal stripes in image frames.

Advantageously, by determining spatial row and column FPN terms using the blurred image frame, there will be a reduced risk of vertical and horizontal objects in the actual imaged scene from being mistaken for row and column noise (e.g., real scene content will be blurred while FPN remains unblurred).

Figure 6:
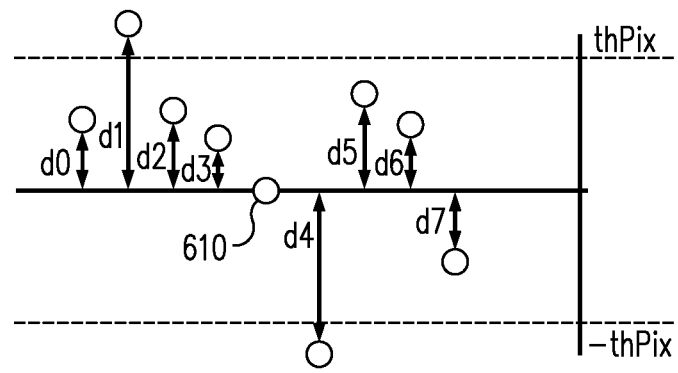
FIG. 6 illustrates differences between neighboring pixels in accordance with an embodiment of the disclosure.

In one embodiment, row and column FPN terms may be determined by considering differences between neighboring pixels of the blurred image frame. For example, FIG. 6 illustrates differences between neighboring pixels in accordance with an embodiment of the disclosure. Specifically, in FIG. 6 a pixel 610 is compared to its 8 nearest horizontal neighbors: d0-d3 on one side and d4-d7 on the other side. Differences between the neighbor pixels can be averaged to obtain an estimate of the offset error of the illustrated group of pixels. An offset error may be calculated for each pixel in a row or column and the average result may be used to correct the entire row or column.

To prevent real scene data from being interpreted as noise, upper and lower threshold values may be used (thPix and −thPix). Pixel values falling outside these threshold values (pixels d1 and d4 in this example) are not used to obtain the offset error. In addition, the maximum amount of row and column FPN correction may be limited by these threshold values.

Further techniques for performing spatial row and column FPN correction processing are set forth in U.S. patent application Ser. No. 12/396,340 filed Mar. 2, 2009 which is incorporated herein by reference in its entirety.

Referring again to FIG. 5, the updated row and column FPN terms determined in block 550 are stored (block 552) and applied (block 555) to the blurred image frame provided in block 545. After these terms are applied, some of the spatial row and column FPN in the blurred image frame may be reduced. However, because such terms are applied generally to rows and columns, additional FPN may remain such as spatially uncorrelated FPN associated with pixel to pixel drift or other causes. Neighborhoods of spatially correlated FPN may also remain which may not be directly associated with individual rows and columns. Accordingly, further processing may be performed as discussed below to determine NUC terms.

In block 560, local contrast values (e.g., edges or absolute values of gradients between adjacent or small groups of pixels) in the blurred image frame are determined. If scene information in the blurred image frame includes contrasting areas that have not been significantly blurred (e.g., high contrast edges in the original scene data), then such features may be identified by a contrast determination process in block 560.

For example, local contrast values in the blurred image frame may be calculated, or any other desired type of edge detection process may be applied to identify certain pixels in the blurred image as being part of an area of local contrast. Pixels that are marked in this manner may be considered as containing excessive high spatial frequency scene information that would be interpreted as FPN (e.g., such regions may correspond to portions of the scene that have not been sufficiently blurred). As such, these pixels may be excluded from being used in the further determination of NUC terms. In one embodiment, such contrast detection processing may rely on a threshold that is higher than the expected contrast value associated with FPN (e.g., pixels exhibiting a contrast value higher than the threshold may be considered to be scene information, and those lower than the threshold may be considered to be exhibiting FPN).

In one embodiment, the contrast determination of block 560 may be performed on the blurred image frame after row and column FPN terms have been applied to the blurred image frame (e.g., as shown in FIG. 5). In another embodiment, block 560 may be performed prior to block 550 to determine contrast before row and column FPN terms are determined (e.g., to prevent scene based contrast from contributing to the determination of such terms).

Following block 560, it is expected that any high spatial frequency content remaining in the blurred image frame may be generally attributed to spatially uncorrelated FPN. In this regard, following block 560, much of the other noise or actual desired scene based information has been removed or excluded from the blurred image frame due to: intentional blurring of the image frame (e.g., by motion or defocusing in blocks 520 through 545), application of row and column FPN terms (block 555), and contrast determination (block 560).

Thus, it can be expected that following block 560, any remaining high spatial frequency content (e.g., exhibited as areas of contrast or differences in the blurred image frame) may be attributed to spatially uncorrelated FPN. Accordingly, in block 565, the blurred image frame is high pass filtered. In one embodiment, this may include applying a high pass filter to extract the high spatial frequency content from the blurred image frame. In another embodiment, this may include applying a low pass filter to the blurred image frame and taking a difference between the low pass filtered image frame and the unfiltered blurred image frame to obtain the high spatial frequency content. In accordance with various embodiments of the present disclosure, a high pass filter may be implemented by calculating a mean difference between a sensor signal (e.g., a pixel value) and its neighbors.

In block 570, a flat field correction process is performed on the high pass filtered blurred image frame to determine updated NUC terms (e.g., if a NUC process has not previously been performed then the updated NUC terms may be new NUC terms in the first iteration of block 570).

Figure 7:
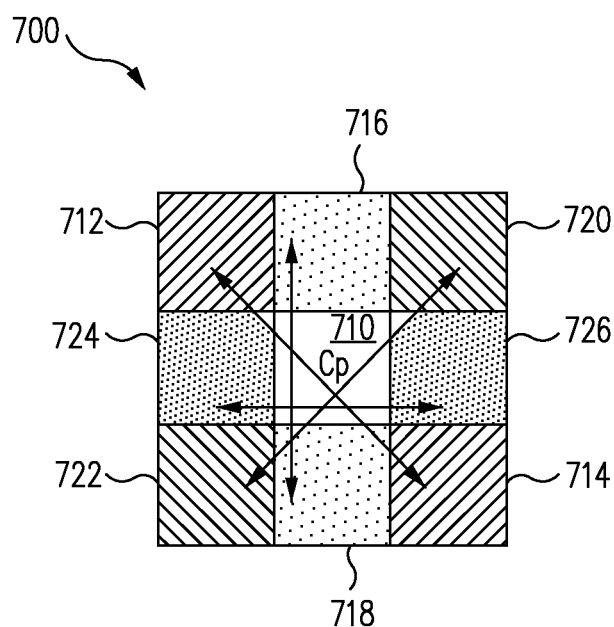
FIG. 7 illustrates a flat field correction technique in accordance with an embodiment of the disclosure.

For example, FIG. 7 illustrates a flat field correction technique 700 in accordance with an embodiment of the disclosure. In FIG. 7, a NUC term may be determined for each pixel 710 of the blurred image frame using the values of its neighboring pixels 712 to 726. For each pixel 710, several gradients may be determined based on the absolute difference between the values of various adjacent pixels. For example, absolute value differences may be determined between: pixels 712 and 714 (a left to right diagonal gradient), pixels 716 and 718 (a top to bottom vertical gradient), pixels 720 and 722 (a right to left diagonal gradient), and pixels 724 and 726 (a left to right horizontal gradient).

These absolute differences may be summed to provide a summed gradient for pixel 710. A weight value may be determined for pixel 710 that is inversely proportional to the summed gradient. This process may be performed for all pixels 710 of the blurred image frame until a weight value is provided for each pixel 710. For areas with low gradients (e.g., areas that are blurry or have low contrast), the weight value will be close to one. Conversely, for areas with high gradients, the weight value will be zero or close to zero. The update to the NUC term as estimated by the high pass filter is multiplied with the weight value.

In one embodiment, the risk of introducing scene information into the NUC terms can be further reduced by applying some amount of temporal damping to the NUC term determination process. For example, a temporal damping factor $\lambda$ between 0 and 1 may be chosen such that the new NUC term ($NUC_{NEW}$) stored is a weighted average of the old NUC term ($NUC_{OLD}$) and the estimated updated NUC term ($NUC_{UPDATE}$). In one embodiment, this can be expressed as $NUC_{NEW} = \lambda \cdot NUC_{OLD} + (1-\lambda) \cdot (NUC_{OLD} + NUC_{UPDATE})$.

Although the determination of NUC terms has been described with regard to gradients, local contrast values may be used instead where appropriate. Other techniques may also be used such as, for example, standard deviation calculations. Other types flat field correction processes may be performed to determine NUC terms including, for example, various processes identified in U.S. Pat. No. 6,028,309 issued Feb. 22, 2000, U.S. Pat. No. 6,812,465 issued Nov. 2, 2004, and U.S. patent application Ser. No. 12/114,865 filed May 5, 2008, which are incorporated herein by reference in their entirety.

Referring again to FIG. 5, block 570 may include additional processing of the NUC terms. For example, in one embodiment, to preserve the scene signal mean, the sum of all NUC terms may be normalized to zero by subtracting the NUC term mean from each NUC term. Also in block 570, to avoid row and column noise from affecting the NUC terms, the mean value of each row and column may be subtracted from the NUC terms for each row and column. As a result, row and column FPN filters using the row and column FPN terms determined in block 550 may be better able to filter out row and column noise in further iterations (e.g., as further shown in FIG. 8) after the NUC terms are applied to captured images (e.g., in block 580 further discussed herein). In this regard, the row and column FPN filters may in general use more data to calculate the per row and per column offset coefficients (e.g., row and column FPN terms) and may thus provide a more robust alternative for reducing spatially correlated FPN than the NUC terms which are based on high pass filtering to capture spatially uncorrelated noise.

In blocks 571-573, additional high pass filtering and further determinations of updated NUC terms may be optionally performed to remove spatially correlated FPN with lower spatial frequency than previously removed by row and column FPN terms. In this regard, some variability in infrared sensors 132 or other components of infrared imaging module 100 may result in spatially correlated FPN noise that cannot be easily modeled as row or column noise. Such spatially correlated FPN may include, for example, window defects on a sensor package or a cluster of infrared sensors 132 that respond differently to irradiance than neighboring infrared sensors 132. In one embodiment, such spatially correlated FPN may be mitigated with an offset correction. If the amount of such spatially correlated FPN is significant, then the noise may also be detectable in the blurred image frame. Since this type of noise may affect a neighborhood of pixels, a high pass filter with a small kernel may not detect the FPN in the neighborhood (e.g., all values used in high pass filter may be taken from the neighborhood of affected pixels and thus may be affected by the same offset error). For example, if the high pass filtering of block 565 is performed with a small kernel (e.g., considering only immediately adjacent pixels that fall within a neighborhood of pixels affected by spatially correlated FPN), then broadly distributed spatially correlated FPN may not be detected.

Figure 11:
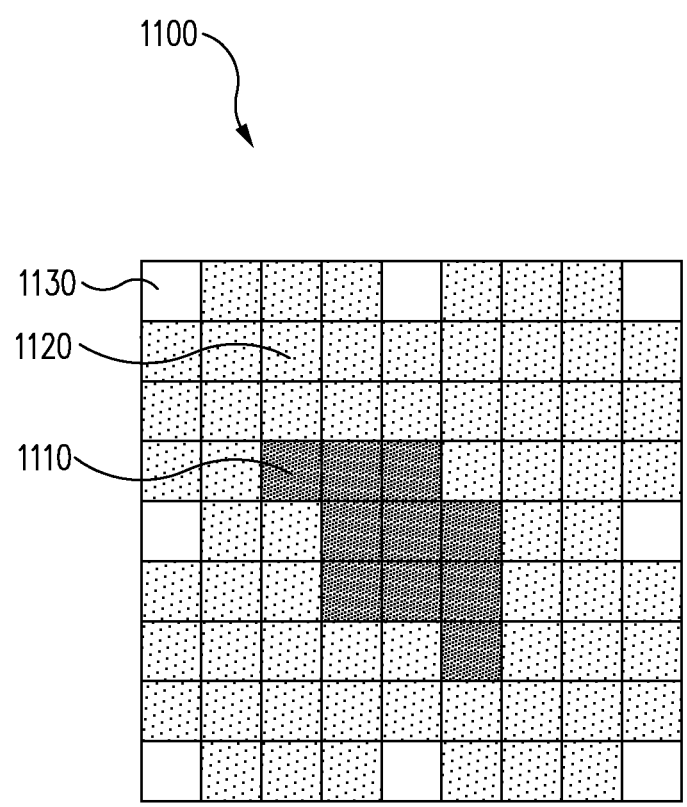
FIG. 11 illustrates spatially correlated fixed pattern noise (FPN) in a neighborhood of pixels in accordance with an embodiment of the disclosure.

For example, FIG. 11 illustrates spatially correlated FPN in a neighborhood of pixels in accordance with an embodiment of the disclosure. As shown in a sample image frame 1100, a neighborhood of pixels 1110 may exhibit spatially correlated FPN that is not precisely correlated to individual rows and columns and is distributed over a neighborhood of several pixels (e.g., a neighborhood of approximately 4 by 4 pixels in this example). Sample image frame 1100 also includes a set of pixels 1120 exhibiting substantially uniform response that are not used in filtering calculations, and a set of pixels 1130 that are used to estimate a low pass value for the neighborhood of pixels 1110. In one embodiment, pixels 1130 may be a number of pixels divisible by two in order to facilitate efficient hardware or software calculations.

Referring again to FIG. 5, in blocks 571-573, additional high pass filtering and further determinations of updated NUC terms may be optionally performed to remove spatially correlated FPN such as exhibited by pixels 1110. In block 571, the updated NUC terms determined in block 570 are applied to the blurred image frame. Thus, at this time, the blurred image frame will have been initially corrected for spatially correlated FPN (e.g., by application of the updated row and column FPN terms in block 555), and also initially corrected for spatially uncorrelated FPN (e.g., by application of the updated NUC terms applied in block 571).

In block 572, a further high pass filter is applied with a larger kernel than was used in block 565, and further updated NUC terms may be determined in block 573. For example, to detect the spatially correlated FPN present in pixels 1110, the high pass filter applied in block 572 may include data from a sufficiently large enough neighborhood of pixels such that differences can be determined between unaffected pixels (e.g., pixels 1120) and affected pixels (e.g., pixels 1110). For example, a low pass filter with a large kernel can be used (e.g., an N by N kernel that is much greater than 3 by 3 pixels) and the results may be subtracted to perform appropriate high pass filtering.

In one embodiment, for computational efficiency, a sparse kernel may be used such that only a small number of neighboring pixels inside an N by N neighborhood are used. For any given high pass filter operation using distant neighbors (e.g., a large kernel), there is a risk of modeling actual (potentially blurred) scene information as spatially correlated FPN. Accordingly, in one embodiment, the temporal damping factor λ may be set close to 1 for updated NUC terms determined in block 573.

In various embodiments, blocks 571-573 may be repeated (e.g., cascaded) to iteratively perform high pass filtering with increasing kernel sizes to provide further updated NUC terms further correct for spatially correlated FPN of desired neighborhood sizes. In one embodiment, the decision to perform such iterations may be determined by whether spatially correlated FPN has actually been removed by the updated NUC terms of the previous performance of blocks 571-573.

After blocks 571-573 are finished, a decision is made regarding whether to apply the updated NUC terms to captured image frames (block 574). For example, if an average of the absolute value of the NUC terms for the entire image frame is less than a minimum threshold value, or greater than a maximum threshold value, the NUC terms may be deemed spurious or unlikely to provide meaningful correction. Alternatively, thresholding criteria may be applied to individual pixels to determine which pixels receive updated NUC terms. In one embodiment, the threshold values may correspond to differences between the newly calculated NUC terms and previously calculated NUC terms. In another embodiment, the threshold values may be independent of previously calculated NUC terms. Other tests may be applied (e.g., spatial correlation tests) to determine whether the NUC terms should be applied.

If the NUC terms are deemed spurious or unlikely to provide meaningful correction, then the flow diagram returns to block 505. Otherwise, the newly determined NUC terms are stored (block 575) to replace previous NUC terms (e.g., determined by a previously performed iteration of FIG. 5) and applied (block 580) to captured image frames.

Figure 8:
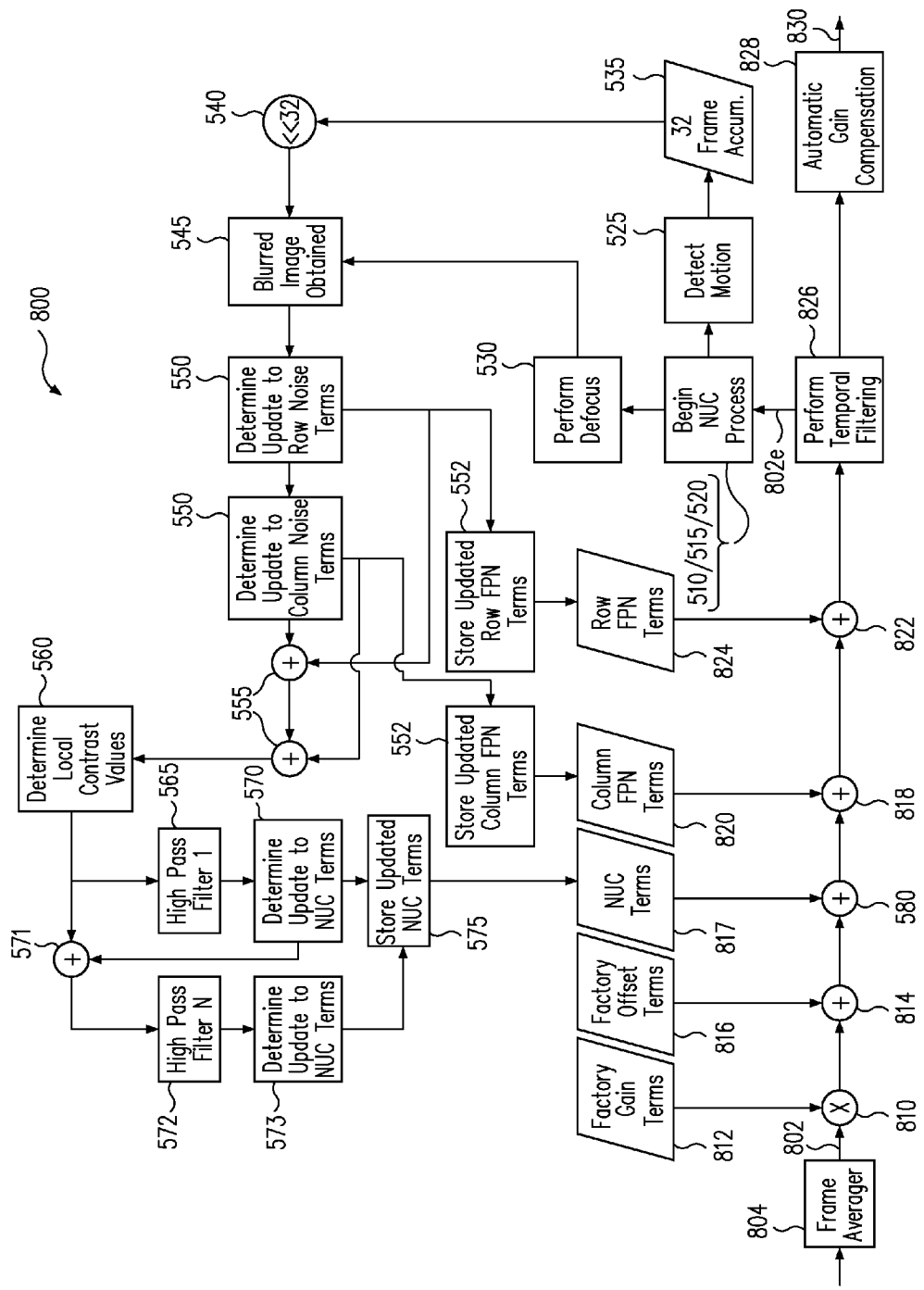
FIG. 8 illustrates various image processing techniques of FIG. 5 and other operations applied in an image processing pipeline in accordance with an embodiment of the disclosure.

FIG. 8 illustrates various image processing techniques of FIG. 5 and other operations applied in an image processing pipeline 800 in accordance with an embodiment of the disclosure. In this regard, pipeline 800 identifies various operations of FIG. 5 in the context of an overall iterative image processing scheme for correcting image frames provided by infrared imaging module 100. In some embodiments, pipeline 800 may be provided by processing module 160 or processor 195 (both also generally referred to as a processor) operating on image frames captured by infrared sensors 132.

Image frames captured by infrared sensors 132 may be provided to a frame averager 804 that integrates multiple image frames to provide image frames 802 with an improved signal to noise ratio. Frame averager 804 may be effectively provided by infrared sensors 132, ROIC 402, and other components of infrared sensor assembly 128 that are implemented to support high image capture rates. For example, in one embodiment, infrared sensor assembly 128 may capture infrared image frames at a frame rate of 240 Hz (e.g., 240 images per second). In this embodiment, such a high frame rate may be implemented, for example, by operating infrared sensor assembly 128 at relatively low voltages (e.g., compatible with mobile telephone voltages) and by using a relatively small array of infrared sensors 132 (e.g., an array of 64 by 64 infrared sensors in one embodiment).

In one embodiment, such infrared image frames may be provided from infrared sensor assembly 128 to processing module 160 at a high frame rate (e.g., 240 Hz or other frame rates). In another embodiment, infrared sensor assembly 128 may integrate over longer time periods, or multiple time periods, to provide integrated (e.g., averaged) infrared image frames to processing module 160 at a lower frame rate (e.g., 30 Hz, 9 Hz, or other frame rates). Further information regarding implementations that may be used to provide high image capture rates may be found in U.S. Provisional Patent Application No. 61/495,879 previously referenced herein.

Image frames 802 proceed through pipeline 800 where they are adjusted by various terms, temporally filtered, used to determine the various adjustment terms, and gain compensated.

In blocks 810 and 814, factory gain terms 812 and factory offset terms 816 are applied to image frames 802 to compensate for gain and offset differences, respectively, between the various infrared sensors 132 and/or other components of infrared imaging module 100 determined during manufacturing and testing.

In block 580, NUC terms 817 are applied to image frames 802 to correct for FPN as discussed. In one embodiment, if NUC terms 817 have not yet been determined (e.g., before a NUC process has been initiated), then block 580 may not be performed or initialization values may be used for NUC terms 817 that result in no alteration to the image data (e.g., offsets for every pixel would be equal to zero).

In blocks 818 and 822, column FPN terms 820 and row FPN terms 824, respectively, are applied to image frames 802. Column FPN terms 820 and row FPN terms 824 may be determined in accordance with block 550 as discussed. In one embodiment, if the column FPN terms 820 and row FPN terms 824 have not yet been determined (e.g., before a NUC process has been initiated), then blocks 818 and 822 may not be performed or initialization values may be used for the column FPN terms 820 and row FPN terms 824 that result in no alteration to the image data (e.g., offsets for every pixel would be equal to zero).

Figure 9:
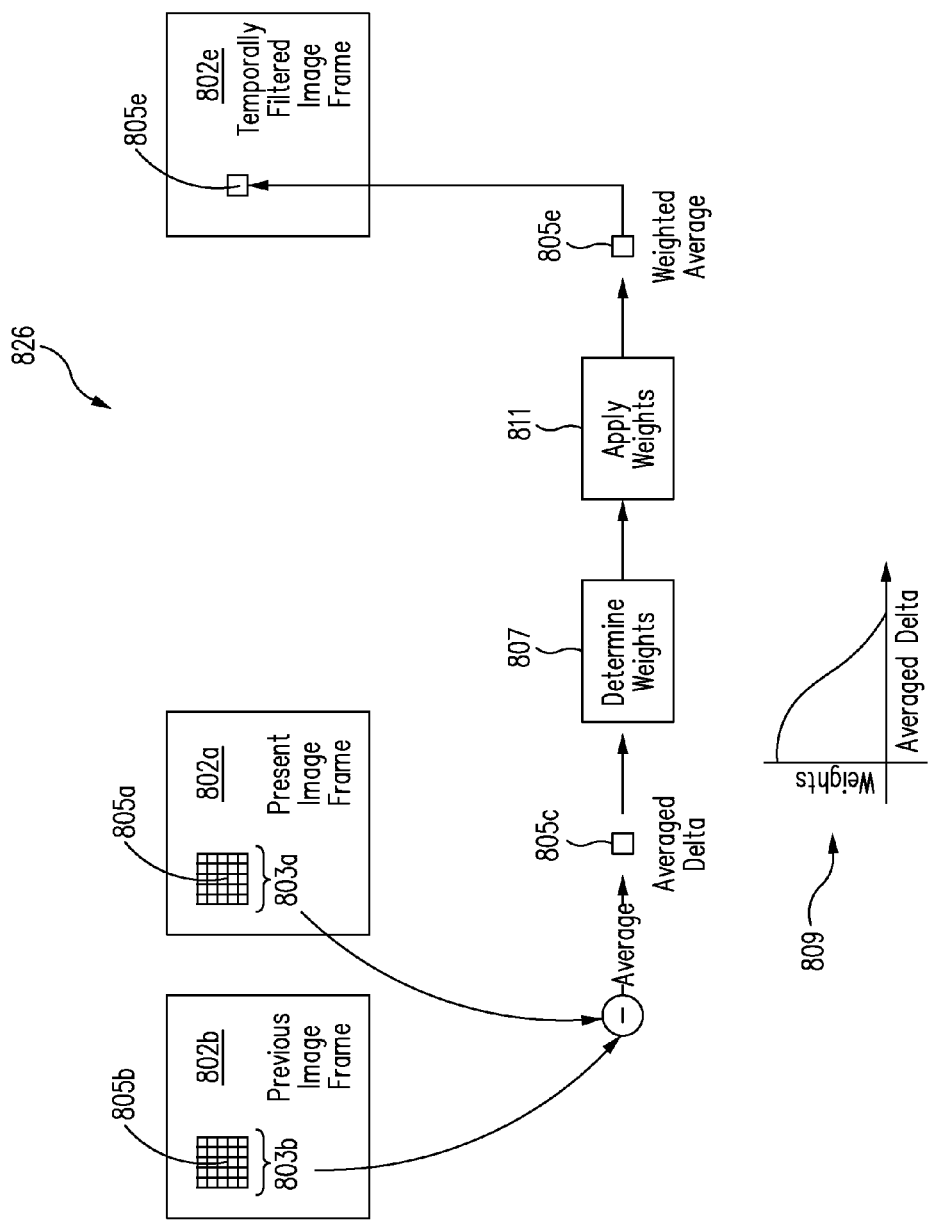
FIG. 9 illustrates a temporal noise reduction process in accordance with an embodiment of the disclosure.

In block 826, temporal filtering is performed on image frames 802 in accordance with a temporal noise reduction (TNR) process. FIG. 9 illustrates a TNR process in accordance with an embodiment of the disclosure. In FIG. 9, a presently received image frame 802a and a previously temporally filtered image frame 802b are processed to determine a new temporally filtered image frame 802e. Image frames 802a and 802b include local neighborhoods of pixels 803a and 803b centered around pixels 805a and 805b, respectively. Neighborhoods 803a and 803b correspond to the same locations within image frames 802a and 802b and are subsets of the total pixels in image frames 802a and 802b. In the illustrated embodiment, neighborhoods 803a and 803b include areas of 5 by 5 pixels. Other neighborhood sizes may be used in other embodiments.

Differences between corresponding pixels of neighborhoods 803a and 803b are determined and averaged to provide an averaged delta value 805c for the location corresponding to pixels 805a and 805b. Averaged delta value 805c may be used to determine weight values in block 807 to be applied to pixels 805a and 805b of image frames 802a and 802b.

In one embodiment, as shown in graph 809, the weight values determined in block 807 may be inversely proportional to averaged delta value 805c such that weight values drop rapidly towards zero when there are large differences between neighborhoods 803a and 803b. In this regard, large differences between neighborhoods 803a and 803b may indicate that changes have occurred within the scene (e.g., due to motion) and pixels 802a and 802b may be appropriately weighted, in one embodiment, to avoid introducing blur across frame-to-frame scene changes. Other associations between weight values and averaged delta value 805c may be used in various embodiments.

The weight values determined in block 807 may be applied to pixels 805a and 805b to determine a value for corresponding pixel 805e of image frame 802e (block 811). In this regard, pixel 805e may have a value that is a weighted average (or other combination) of pixels 805a and 805b, depending on averaged delta value 805c and the weight values determined in block 807.

For example, pixel 805e of temporally filtered image frame 802e may be a weighted sum of pixels 805a and 805b of image frames 802a and 802b. If the average difference between pixels 805a and 805b is due to noise, then it may be expected that the average change between neighborhoods 805a and 805b will be close to zero (e.g., corresponding to the average of uncorrelated changes). Under such circumstances, it may be expected that the sum of the differences between neighborhoods 805a and 805b will be close to zero. In this case, pixel 805a of image frame 802a may both be appropriately weighted so as to contribute to the value of pixel 805e.

However, if the sum of such differences is not zero (e.g., even differing from zero by a small amount in one embodiment), then the changes may be interpreted as being attributed to motion instead of noise. Thus, motion may be detected based on the average change exhibited by neighborhoods 805a and 805b. Under these circumstances, pixel 805a of image frame 802a may be weighted heavily, while pixel 805b of image frame 802b may be weighted lightly.

Other embodiments are also contemplated. For example, although averaged delta value 805c has been described as being determined based on neighborhoods 805a and 805b, in other embodiments averaged delta value 805c may be determined based on any desired criteria (e.g., based on individual pixels or other types of groups of sets of pixels).

In the above embodiments, image frame 802a has been described as a presently received image frame and image frame 802b has been described as a previously temporally filtered image frame. In another embodiment, image frames 802a and 802b may be first and second image frames captured by infrared imaging module 100 that have not been temporally filtered.

Figure 10:
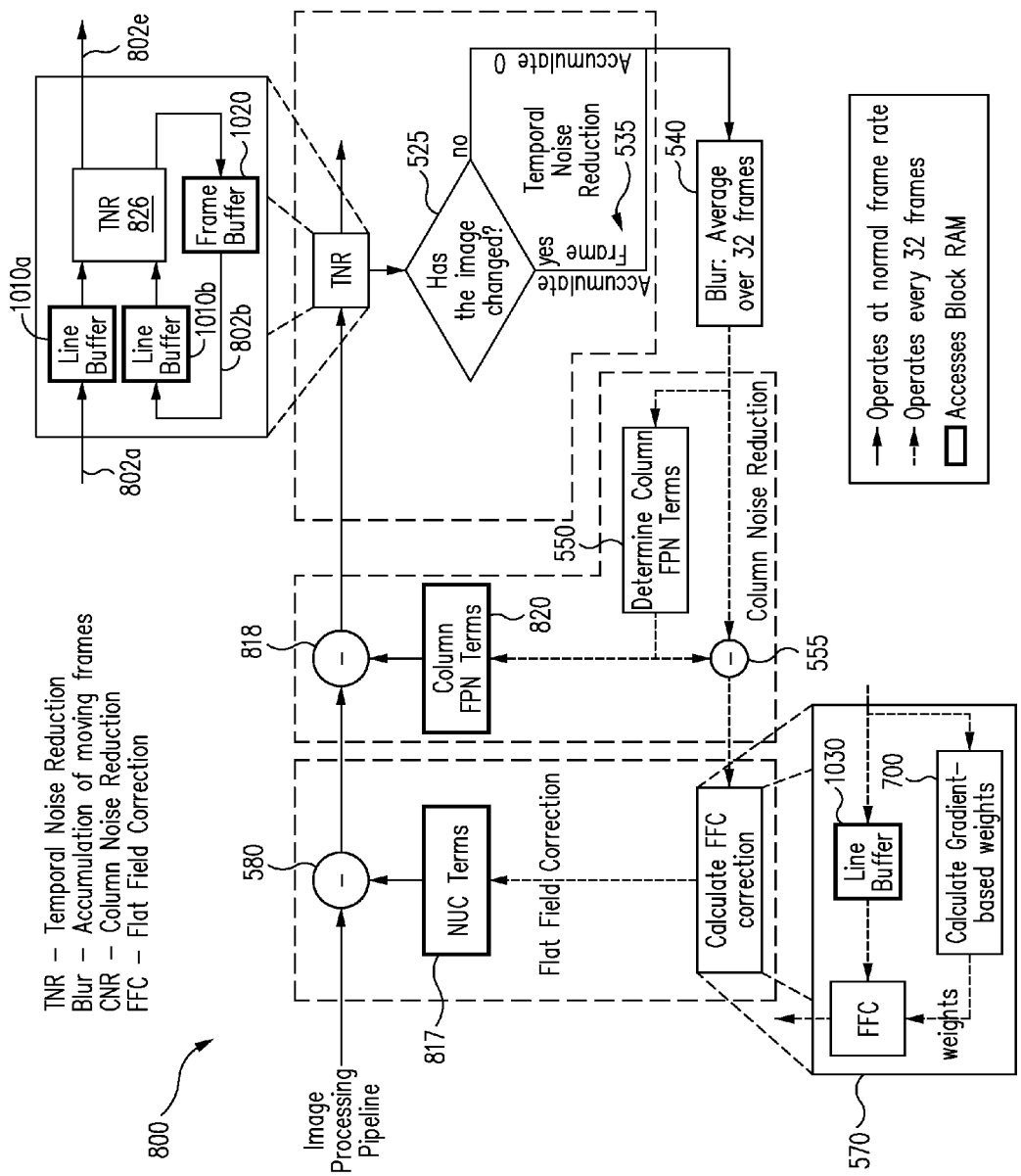
FIG. 10 illustrates particular implementation details of several processes of the image processing pipeline of FIG. 8 in accordance with an embodiment of the disclosure.

FIG. 10 illustrates further implementation details in relation to the TNR process of block 826. As shown in FIG. 10, image frames 802a and 802b may be read into line buffers 1010a and 1010b, respectively, and image frame 802b (e.g., the previous image frame) may be stored in a frame buffer 1020 before being read into line buffer 1010b. In one embodiment, line buffers 1010a-b and frame buffer 1020 may be implemented by a block of random access memory (RAM) provided by any appropriate component of infrared imaging module 100 and/or host device 102.

Referring again to FIG. 8, image frame 802e may be passed to an automatic gain compensation block 828 for further processing to provide a result image frame 830 that may be used by host device 102 as desired.

FIG. 8 further illustrates various operations that may be performed to determine row and column FPN terms and NUC terms as discussed. In one embodiment, these operations may use image frames 802e as shown in FIG. 8. Because image frames 802e have already been temporally filtered, at least some temporal noise may be removed and thus will not inadvertently affect the determination of row and column FPN terms 824 and 820 and NUC terms 817. In another embodiment, non-temporally filtered image frames 802 may be used.

In FIG. 8, blocks 510, 515, and 520 of FIG. 5 are collectively represented together. As discussed, a NUC process may be selectively initiated and performed in response to various NUC process initiating events and based on various criteria or conditions. As also discussed, the NUC process may be performed in accordance with a motion-based approach (blocks 525, 535, and 540) or a defocus-based approach (block 530) to provide a blurred image frame (block 545). FIG. 8 further illustrates various additional blocks 550, 552, 555, 560, 565, 570, 571, 572, 573, and 575 previously discussed with regard to FIG. 5.

As shown in FIG. 8, row and column FPN terms 824 and 820 and NUC terms 817 may be determined and applied in an iterative fashion such that updated terms are determined using image frames 802 to which previous terms have already been applied. As a result, the overall process of FIG. 8 may repeatedly update and apply such terms to continuously reduce the noise in image frames 830 to be used by host device 102.

Referring again to FIG. 10, further implementation details are illustrated for various blocks of FIGS. 5 and 8 in relation to pipeline 800. For example, blocks 525, 535, and 540 are shown as operating at the normal frame rate of image frames 802 received by pipeline 800. In the embodiment shown in FIG. 10, the determination made in block 525 is represented as a decision diamond used to determine whether a given image frame 802 has sufficiently changed such that it may be considered an image frame that will enhance the blur if added to other image frames and is therefore accumulated (block 535 is represented by an arrow in this embodiment) and averaged (block 540).

Also in FIG. 10, the determination of column FPN terms 820 (block 550) is shown as operating at an update rate that in this example is 1/32 of the sensor frame rate (e.g., normal frame rate) due to the averaging performed in block 540. Other update rates may be used in other embodiments. Although only column FPN terms 820 are identified in FIG. 10, row FPN terms 824 may be implemented in a similar fashion at the reduced frame rate.

FIG. 10 also illustrates further implementation details in relation to the NUC determination process of block 570. In this regard, the blurred image frame may be read to a line buffer 1030 (e.g., implemented by a block of RAM provided by any appropriate component of infrared imaging module 100 and/or host device 102). The flat field correction technique 700 of FIG. 7 may be performed on the blurred image frame.

In view of the present disclosure, it will be appreciated that techniques described herein may be used to remove various types of FPN (e.g., including very high amplitude FPN) such as spatially correlated row and column FPN and spatially uncorrelated FPN.

Other embodiments are also contemplated. For example, in one embodiment, the rate at which row and column FPN terms and/or NUC terms are updated can be inversely proportional to the estimated amount of blur in the blurred image frame and/or inversely proportional to the magnitude of local contrast values (e.g., determined in block 560).

In various embodiments, the described techniques may provide advantages over conventional shutter-based noise correction techniques. For example, by using a shutterless process, a shutter (e.g., such as shutter 105) need not be provided, thus permitting reductions in size, weight, cost, and mechanical complexity. Power and maximum voltage supplied to, or generated by, infrared imaging module 100 may also be reduced if a shutter does not need to be mechanically operated. Reliability will be improved by removing the shutter as a potential point of failure. A shutterless process also eliminates potential image interruption caused by the temporary blockage of the imaged scene by a shutter.

Also, by correcting for noise using intentionally blurred image frames captured from a real world scene (not a uniform scene provided by a shutter), noise correction may be performed on image frames that have irradiance levels similar to those of the actual scene desired to be imaged. This can improve the accuracy and effectiveness of noise correction terms determined in accordance with the various described techniques.

Figure 12:
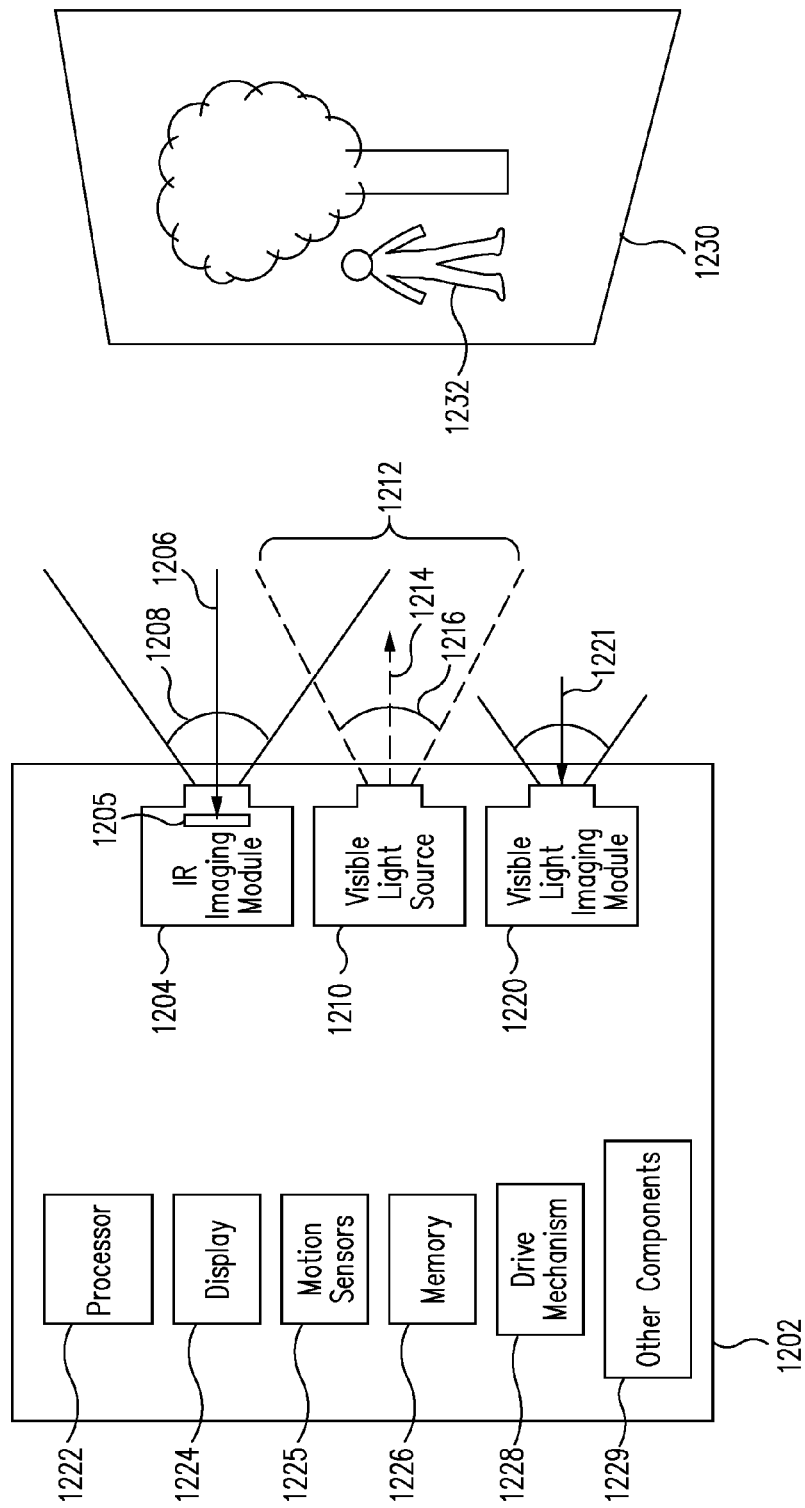
FIG. 12 illustrates a block diagram of a system having an infrared imaging module used to align a visible light source in accordance with an embodiment of the disclosure.

FIG. 12 illustrates a block diagram of a system 1202, having an infrared imaging module 1204 used to align a visible light source 1210 in accordance with an embodiment of the disclosure. System 1202 may include infrared imaging module 1204, visible light source 1210, a visible light imaging module 1220, a processor 1222, a display 1224, motion sensors 1225, a memory 1226, a drive mechanism 1228 (e.g., a motor, an actuator, and/or other appropriate machine), and other components 1229. In one embodiment, the various components of system 1202 may be implemented in the same or similar manner as corresponding components of host device 102 of FIG. 1. Moreover, the various components of system 1202 may be configured to perform various NUC processes and other processes described herein.

Infrared imaging module 1204 may be a small form factor infrared camera or a small form factor infrared imaging device implemented in accordance with various embodiments disclosed herein. Infrared imaging module 1204 may be configured to capture, process, and/or otherwise manage infrared images (e.g., including thermal images) of a scene 1230, and provide such images to processor 1222.

Infrared imaging module 1204 may include an FPA 1205 implemented, for example, in accordance with various embodiments disclosed herein or others where appropriate. Infrared imaging module 1204 may define an optical axis 1206 substantially perpendicular to FPA 1205 and between scene 1230 and infrared imaging module 1204. Infrared imaging module 1204 may also have a field of view (FOV) 1208, defining the area or solid angle associated with images captured by infrared imaging module 1204.

In various embodiments, visible light source 1210 may be implemented with an electric lamp, an arc lamp, a solid-state electronic light (e.g., LED light), an electronic flashtube (e.g., a strobe used in flash photography), a laser, and/or various other lamps or light emitting sources known in the art. Visible light source 1210 may also be implemented with various lenses, reflectors, and/or other optical elements to form a visible light beam 1212 having an optical axis 1214 and a beam angle 1216. Optionally, visible light source 1210 may be implemented with a focused light source capable of forming a visible light beam without the aid of optical elements.

Visible light source 1210 may be configured to be selectively directed to align visible light source 1210 with a desired subject 1232 and project a visible light beam substantially along optical axis 1214 and substantially on subject 1232. Visible light source 1210 may be configured to selectively project visible light beam 1212 when desired, for example, while visible light source 1210 is substantially aligned with subject 1232.

In some embodiments, infrared imaging module 1204 may be oriented so that optical axis 1206 of infrared imaging module 1204 is substantially parallel to visible light beam 1212 projected from visible light source 1210. In such embodiments, the center of scene 1230 may substantially coincide with the center of visible light beam 1212 in thermal images captured by infrared imaging module 1204. Optionally in such embodiments, parallax error correction techniques may be employed where appropriate, so that the center of scene 1230 may more accurately coincide with the center of visible light beam 1212 in thermal images captured by infrared imaging module 1204.

In some embodiments, FOV 1208 of infrared imaging module 1204 may be larger than beam angle 1216 of visible light beam 1212 projected from visible light source 1210. In such embodiments, scene 1230 in thermal images capture by infrared imaging module 1204 and processed by processor 1222, may cover an area larger than an area to be illuminated by visible light beam 1212. This allows system 1202 to generate and provide alignment guide information which may be used to selectively direct visible light source 1210 (and thus direct visible light beam 1212) to illuminate a desired portion of scene 1230, such as subject 1232.

Visible light imaging module 1220 may be implemented with a CCD sensor, a CMOS sensor, and/or other appropriate image sensors to capture visible light images. In some embodiments, visible light imaging module 1220 may be oriented so that an optical axis 1221 of visible light imaging module 1220 is substantially parallel to visible light beam 1212 and/or optical axis 1206 of infrared imaging module 1204.

In some embodiments, a thermal image captured by infrared imaging module 1204 may be superimposed on a visible light image captured by visible light imaging module 1220 for viewing by a user on display 1224.

Processor 1222 may be implemented as any appropriate processing device as described with regard to processor 195 in FIG. 1. In some embodiments, at least some part of processor 1222 may be implemented as part of infrared imaging module 1204.

Processor 1222 may be configured to receive one or more thermal images captured by infrared imaging module 1204, and to process the thermal image to generate alignment guide information for aligning visible light source 1210 with subject 1232. In one embodiment, alignment guide information generated by processor 1222 may include an image (e.g., a thermogram) of scene 1230 based on a thermal image captured by infrared imaging module 1204. A user or machine may, for example, selectively direct visible light source 1210 even in darkness based on the image of scene 1230, and then project a visible light beam on a desired subject when visible light source 1210 is aligned as desired.

In another embodiment, alignment guide information generated by processor 1222 may include a framing reticle overlaid on a user-viewable image based on a thermal image of scene 1230 captured by infrared imaging module 1204. A framing reticle may indicate substantially the center of visible light beam 1212 and/or a corresponding area of scene 1230 to be illuminated by visible light beam 1212.

In another embodiment, alignment guide information generated by processor 1222 may include a user-viewable cue indicating how visible light source 1210 should be directed to project visible light beam 1212 on subject 1232. For example, processor 1222 may detect subject 1232 in a thermal image captured by infrared imaging module 1204, determine the location of subject 1232 relative to an area to be illuminated by a visible light beam projected from visible light source 1210, and generate directional information indicating a direction in which visible light source 1210 should be panned, tilted, and/or otherwise directed in order to project visible light beam 1212 on subject 1232. In this regard, a user-viewable cue may be presented as text, a graphic (e.g., as a directional arrow or otherwise), and/or any other appropriate representation. In other embodiments, such a cue may be presented in an audible form in addition to, or instead of, a user-viewable form.

Display 1224 may be used to present to a user the alignment guide information generated by processor 1222. Motion sensors 1225 may be implemented in the same or similar manner as described with regard to motion sensors 194 in FIG. 1. Motion sensors 1225 may be monitored by and provide information to infrared imaging module 1204 and/or processor 1222 for performing various NUC techniques described herein. Other components 1229 may be used to implement any feature (e.g., parallax correction, auto focus, beam angle control, light intensity control, and/or others) as may be desired for various applications of system 1202.

In some embodiments, drive mechanism 1228 (e.g., motors or actuators) may be configured to provide a force for selectively directing visible light source 1210 to align visible light source 1210 with a desired subject. In such embodiments, various components of system 1202, including processor 1222, may be further configured to provide input signals and/or data to drive mechanism 1228 for automatically aligning visible light source 1210 without direction by a human operator. For example, processor 1222 may detect subject 1232 in a thermal image captured by infrared imaging module 1204, determine the location of subject 1232 relative to an area to be illuminated by visible light beam 1212 projected from visible light source 1210, and generate input signals and/or data for drive mechanism 122 to pan, tilt, and/or otherwise direct visible light source 1210 in a desired direction for aligning visible light source 1210 with subject 1232. It will be appreciated that input signals and/or data for drive mechanism 1228 may also be generated based at least in part on other alignment guide information.

Referring now to FIGS. 13A-C, various views are shown of a system implemented as a spotlight 1302 (e.g., also referred to as a spotlight system) having an infrared imaging module 1304 used to align a visible light source 1310 in accordance with embodiments of the disclosure.

In particular, FIG. 13A illustrates a perspective view of spotlight 1302 and a scene 1330 including a subject 1332 presented to spotlight 1302. FIG. 13B illustrates a front view of spotlight 1302. FIG. 13C illustrates a front view of a display 1324 of spotlight 1302, including a screenshot of alignment guide information presented on display 1324.

Spotlight 1302 may include infrared imaging module 1304, visible light source 1310, a processor 1322, display 1324, and drive mechanisms 1328, all of which may be implemented in the same or similar manner as various corresponding components of system 1202 described above with regard to FIG. 12. In one embodiment, spotlight 1302 may further comprise a pedestal 1336 and a u-shaped yoke 1338 for supporting a body 1334 of spotlight 1302. U-shaped yoke 1338 may be rotatably coupled to body 1334 and pedestal 1336 to provide axes of rotation 1337 and 1339 as shown in FIG. 13B.

As similarly described above with regard to infrared imaging module 1204 of FIG. 12, infrared imaging module 1304 may have an optical axis 1306 and a field of view 1308. As also similarly described above with regard to the light source 1210 of FIG. 12, light source 1310 may be configured to form a visible light beam 1312 having an optical axis 1314 and a beam angle 1316.

In the embodiment shown in FIGS. 13A-C, infrared imaging module 1304 may be oriented so that optical axis 1306 of infrared imaging module 1304 is substantially parallel to visible light beam 1312 projected from visible light source 1310. Also in this embodiment, field of view 1308 of infrared imaging module 1304 is larger than beam angle 1316 of visible light beam 1312 projected from visible light source 1310. Thus, in this embodiment, processor 1322 may generate alignment guide information based on thermal images of scene 1330 larger than an illumination area 1318, which information may be used to selectively direct visible light source 1310 (and thus direct visible light beam 1312) to illuminate a desired portion of scene 1330.

In FIG. 13C, a screenshot of display 1324 is illustrated with alignment guide information provided in the form of an image 1340 (e.g., a thermogram) of scene 1330 based on a thermal image captured by infrared imaging module 1304. Such alignment guide information may also include a framing reticle 1346 overlaid on image 1340. Framing reticle 1346 may indicate substantially the center of visible light beam 1312 and the portion of image 1340 corresponding to illumination area 1318. Alignment guide information generated by processor 1332 may also include a user-viewable cue 1344, presented graphically in this embodiment as an arrow, indicating how visible light source 1310 should be directed to project visible light beam 1312 on subject 1332.

Thus, for example, an operator of spotlight 1302 may align visible light source 1310 with subject 1332, who may be an actor in position on a dark stage and/or behind a curtain, before turning on visible light source 1310 to project visible light beam 1312 on subject 1332 (e.g., the actor) as a play or an act commences. From the alignment guide information presented on display 1324 as shown in FIG. 13C, the operator can view image 1340 that clearly shows a thermographic shape 1342 of subject 1332. Accordingly, the operator may pan, tilt, and/or otherwise direct visible light source 1310 so that framing reticle 1346 indicating illumination area 1318 substantially overlaps with thermographic shape 1342 of subject 1332. The operator may also rely on user-viewable cue 1344, which in this non-limiting example indicates that visible light source should be directed to the right in order to project visible light beam 1312 substantially on subject 1332 (e.g., the actor on a dark stage represented by thermographic shape 1342 in FIG. 13C) when visible light source 1310 is turned on.

Although the above example has been describe with respect to a human operator, in some embodiments visible light source 1310 may be aligned without direction from a human operator, as described above with regard to FIG. 12. In such embodiments, drive mechanisms 1328 may be machine operated to provide rotational force to u-shaped yoke 1338 and/or other components for panning and/or tilting visible light source 1310, based on input signals and/or data from processor 1322. It will be appreciated that any appropriate structure may be employed for supporting body 1334 and providing axes of rotation and movement, and not limited to u-shaped yoke 1338. It will also be appreciated that drive mechanisms 1328 may be coupled to any such appropriate structure in any appropriate manner for providing rotational and/or directional force for directing visible light source 1310.

Referring now to FIGS. 14A-C, various views are shown of a system implemented as a camera 1402 (e.g., also referred to as a camera system) having an infrared imaging module 1404 used to align a visible light source 1410 (e.g., a flash in this embodiment) in accordance with embodiments of the disclosure. For example, FIG. 14A illustrates a front view of camera 1402. FIG. 14B illustrates a top view of camera 1402 and a top view of subjects 1432. FIG. 14C illustrates a back view of camera 1402 including a display 1424 presenting alignment guide information for viewing by a user.

Camera 1402 may include infrared imaging module 1404, flash 1410, a visible light imaging module 1420, a main lens unit 1419 for passing visible light through to visible light imaging module 1420, a processor 1422, and display 1424, all of which may be implemented in the same or similar manner as various corresponding components of system 1202 and spotlight 1302 as described above with regard to FIGS. 12 and 13A-C. In one embodiment, camera 1402 may further comprise a viewfinder 1423, camera control buttons 1427, and a shutter button 1428.

In one embodiment, infrared imaging module 1404 may be disposed on a front side of a body 1434 of camera 1402, adjacent to main lens unit 1419, so that an optical axis 1406 of infrared imaging module 1404 is substantially parallel to an optical axis 1421 of visible light imaging module 1420. Infrared imaging module 1404 may have a field of view 1408 that is larger than the field of view provided by main lens unit 1419 to visible light imaging module 1420.

Flash 1410 may be configured to project a visible light beam 1412, directly and/or indirectly (e.g., bounced lighting), substantially on subjects 1432 to be captured by visible light imaging module 1420 of camera 1402, when subjects 1432 are framed in a shot (and thus aligned with flash 1410) as desired. In various embodiments, flash 1410 may be: detachable; fixedly disposed within, on the front, or on the top side of body 1434; folded in and out of body 1434; or otherwise appropriately provided.

Processor 1422 may be configured to perform other camera operations (e.g., auto focus control, visible light image processing, light metering, and/or others), in addition to generating alignment guide information for aligning flash 1410 with subject 1432 as similarly described with respect to FIGS. 12 and 13A-C.

In some embodiments, processor 1422 may be configured to superimpose a corresponding portion of a thermal image captured by infrared imaging module 1404, onto a visible light image captured by visible light imaging module 1420. For example, processor 1424 may superimpose a corresponding portion of a thermal image onto a live visible light image captured by visible light imaging module 1420 on display 1424 or viewfinder 1423 to generate a user-viewable image 1440 (e.g., a thermogram). As a result, the user may frame shots looking at display 1424 or viewfinder 1423 as the user normally would, but at the same time be presented with alignment guide information that aids the user to frame shots even in darkness or low light conditions.

In some embodiments, processor 1422 may be configured to generate a user-viewable image 1440 having a higher resolution than what may be provided by infrared imaging module 1404, by superimposing a thermal image captured by infrared imaging module 1404 onto a visible light image captured by visible light imaging module 1420. In some embodiments, processor 1422 may be configured to store a computer-viewable image file (e.g., a jpeg file, a bmp file, a psd file, a gif file, a tiff file, and/or other appropriately formatted file) of user-viewable image 1440, in addition to, or in place of, a computer-viewable image of a visible light image.

Display 1424 may be configured to present other appropriate camera-related information (e.g., camera settings and live view for framing), in addition to presenting alignment guide information for aligning flash 1410 with subject 1432 as similarly described with respect to FIGS. 12 and 13A-C. In addition to or in place of display 1424, viewfinder 1423 may be provided and configured to present alignment guide information and/or other appropriate camera-related information. In one embodiment, viewfinder 1423 may be implemented as an electronic viewfinder having a small screen presenting substantially the same information as display 1424. In another embodiment, viewfinder 1423 may be implemented as an optical viewfinder having an information panel (e.g., a panel having various lighted icons and/or displays for indicating camera settings). In such an embodiment, the information panel may comprise appropriate lighted icons for presenting alignment guide information (e.g., lighted arrows and an 'OK' icon for presenting a user-viewable cue).

Thus, for example, a user of camera 1402 may frame subjects 1432 in a shot as desired (and thus align flash 1410 with subject 1432 to project visible light beam 1412 substantially on subject 1432 when the shot is taken with flash 1410 firing) even in darkness by viewing alignment guide information on display 1424 or viewfinder 1423. As shown in a screenshot of display 1424 of FIG. 14C, a user can view user-viewable image 1440 which includes a corresponding portion of a thermal image superimposed onto a visible light image, and frame a shot as the user normally would. The user may also rely on user-viewable cue 1444, which in this non-limiting example is graphically presented as an arrow, along with a subject count indicating the number of possible subjects in the direction indicated by the arrow. The user may then press shutter button 1428 to fire flash 1410 to project visible light beam 1412 on subjects 1432 while a photograph of the framed shot is being taken.

In various embodiments, thermal images captured by infrared imaging module 1304 and visible light images captured by visible light imaging module 1420 may be stored by camera 1402 (e.g., in an appropriate volatile or non-volatile memory).

In various embodiments, camera 1402 may be provided with a tripod, an arm, a track, a crane, and/or any other appropriate structure for supporting the body 1434 of camera 1402 and for providing axes of rotation and movement. Such structures may be coupled to drive mechanisms (e.g., motors or actuators) that provide a force to automatically align flash 1410 with subjects 1432 without direction from a user, as similarly described above with respect to FIGS. 12 and 13A-C.

Figure 15:
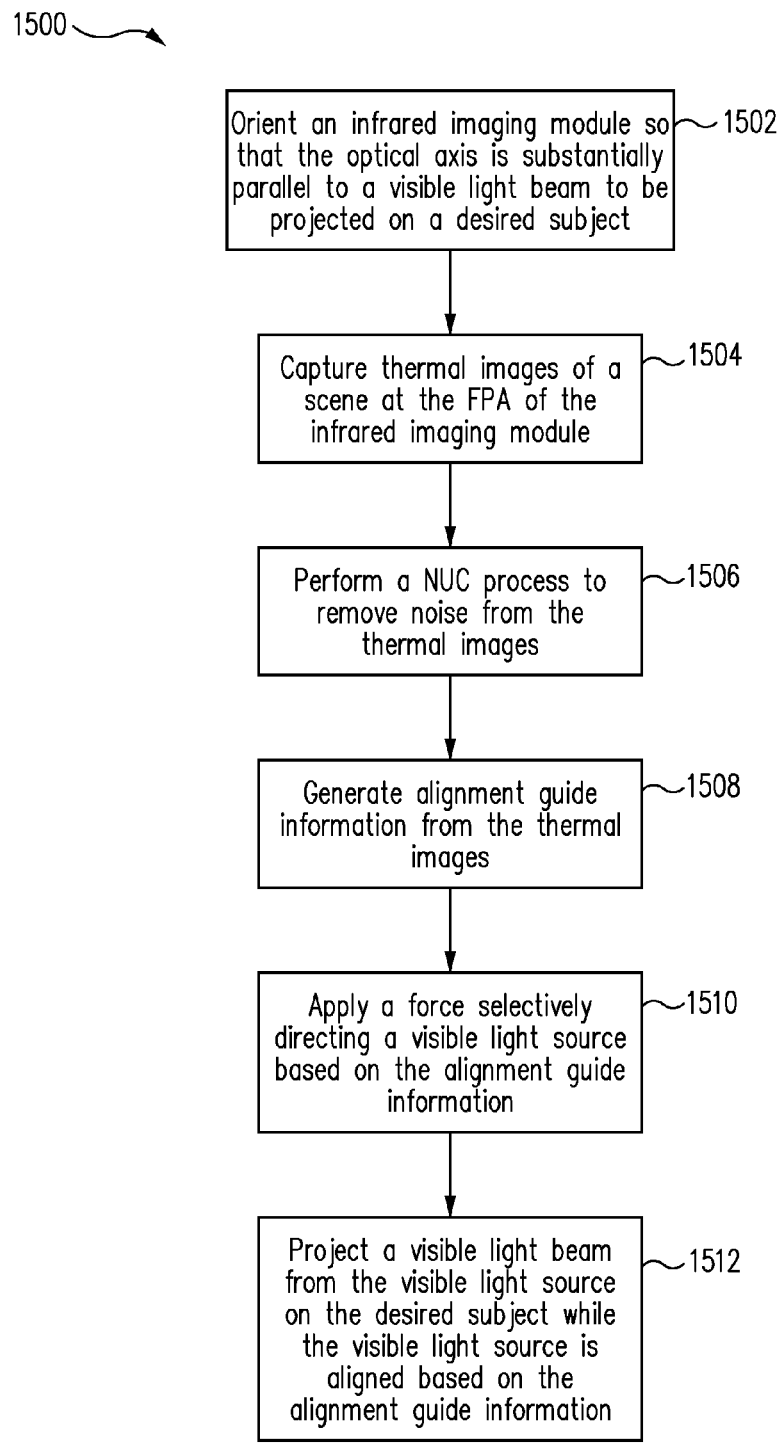
FIG. 15 illustrates a process of selectively directing a visible light source using alignment guide information generated from thermal images in accordance with an embodiment of the disclosure.

FIG. 15 illustrates a process 1500 of selectively directing visible light source 1210/1310/1410 using alignment guide information generated from thermal images captured by an infrared imaging module, in accordance with an embodiment of the disclosure.

At block 1502, an infrared imaging module may be oriented so that an optical axis of infrared imaging module is substantially parallel to visible light beam 1212/1312/1412 to be projected from visible light source 1210/1310/1410. For example, infrared imaging module 1204/1304/1404 may be oriented relative to visible light source 1210/1310/1410, so that optical axis 1206/1306/1406 of infrared imaging module 1204/1304/1404 is substantially parallel to visible light beam 1212/1312/1412.

At block 1504, one or more thermal images may be captured by infrared imaging module 1204/1304/1404. The one or more thermal images may be received, for example, at processor 1222/1322/1422, and then at block 1506, a NUC process may be performed to remove noise from the thermal images, for example, by using various NUC techniques disclosed herein.

From the thermal images, alignment guide information may be generated at block 1508. For example, alignment guide information including a user-viewable image, a framing reticle, a user-viewable cue, an audible cue, and/or information in other forms may be generated by processor 1222/1322/1422 as described.

At block 1510, based on the alignment guide information generated at block 1508, a user may apply a force which is received by system 1202/1302/1402 to selectively direct and thus align visible light source 1210/1310/1410 with subject 1232/1332/1432 before projecting visible light beam 1212/1312/1412 on subject 1232/1332/1432. Alternatively, or additionally, drive mechanisms may generate a force which is received by system 1202/1302/1402 to selectively direct and thus align visible light source 1210/1310/1410 in response to input signals and/or data provided by, for example, processor 1222/1322/1422 (e.g., without input from a user).

At block 1512, visible light beam 1212/1312/1412 may be projected substantially on subject 1232/1332/1432 while visible light source 1210/1310/1410 is aligned based on the alignment guide information. For example, a user or machine may turn on a stage spotlight or take a flash photograph when visible light source 1210/1310/flash 1410 is aligned with subject 1232/1332/1432 as desired based on the alignment guide information, so that visible light beam 1212/1312/1412 is projected by system 1202/1302/1402 on subject 1232/1332/1432.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
    an infrared imaging module comprising a focal plane array (FPA) configured to capture a thermal image of a scene within a field of view (FOV) of the infrared imaging module;
    a visible light source configured to project a visible light beam having a beam angle that is narrower than and within the FOV of the infrared imagine module such that the thermal image covers a larger area of the scene than an area to be illuminated by the visible light beam; and
    a processor configured to generate alignment guide information based on a location of a subject in the thermal image of the scene relative to the area to be illuminated by the light beam;
    wherein the visible light source is configured to be selectively directed based on the alignment guide information to substantially align the visible light source with the subject and project the visible light beam substantially on the subject.

2. The system of claim 1, wherein optical axes of the infrared imaging module and the visible light source are fixed relative to each other.

3. The system of claim 1, further comprising a display configured to present the alignment guide information to a user.

4. The system of claim 3, wherein:
    the processor is configured generate a user-viewable image of the scene based on the captured thermal image; and
    alignment guide information comprises the user-viewable image presented on the display.

5. The system of claim 3, wherein the alignment guide information comprises a user-viewable cue indicating how the visible light source should be directed to project the visible light beam substantially on the subject.

6. The system of claim 1, further comprising a visible light imaging module configured to capture a visible light image of the scene, wherein:
    optical axes of the infrared imaging module and the visible light imaging module are fixed relative to each other; and
    the visible light imaging module is configured to be selectively directed based on the alignment guide information to substantially align the visible light imaging module with the subject.

7. The system of claim 6, wherein:
    the visible light imaging module has a FOV that is narrower and within the FOV of the infrared imaging module; and
    the system is a camera and the visible light source is a flash of the camera.

8. The system of claim 1, wherein the system is a spotlight.

9. The system of claim 1, wherein the visible light source is selectively directed by a user of the system.

10. The system of claim 1, wherein the visible light source is selectively directed by the system without requiring direction by a user.

11. A method of operating a system, the method comprising:
    capturing, by an infrared imaging module having a focal plane array (FPA), a thermal image of a scene within a field of view (FOV) of the infrared imaging module;
    generating alignment guide information for aligning a visible light source configured to project a visible light beam having a beam angle that is narrower than and within the FOV of the infrared imaging module such that the thermal image covers a larger area of the scene than an area to be illuminated by the visible light beam;
    receiving a force to selectively direct the visible light source to substantially align the visible light source with a subject based on the alignment guide information; and
    projecting a visible light beam from the visible light source substantially on the subject while the visible light source is aligned based on the alignment guide information;
    wherein the generating of the alignment guide information is based on a location of the subject in the thermal image of the scene relative to the area to be illuminated by the light beam.

12. The method of claim 11, wherein optical axes of the infrared imaging module and the visible light source are fixed relative to each other.

13. The method of claim 11, further comprising displaying the alignment guide information to a user.

14. The method of claim 13, further comprising generating a user-viewable image of the scene based on the captured thermal image, wherein the displaying of the alignment guide information comprises displaying the user-viewable image of the scene.

15. The method of claim 13, wherein the displaying of the alignment guide information comprises displaying a user-viewable cue indicating how the visible light source should be directed to project the visible light beam substantially on the subject.

16. The method of claim 11, further comprising:
receiving a force to selectively direct a visible light imaging module to substantially align the visible light imaging module with the subject based on the alignment guide information, the visible light imaging module having a FOV that is narrower and within the FOV of the infrared imaging module and having an optical axis that is fixed relative to an optical axis of the infrared imaging module; and
capturing a visible light image of the subject by the visible light imaging module while the visible light imaging module is aligned based on the alignment guide information.

17. The method of claim 16, wherein the system is a camera and the visible light source is a flash of the camera.

18. The method of claim 11, wherein the system is a spotlight.

19. The method of claim 11, wherein the force is provided by a user of the system.

20. The method of claim 11, wherein the force is provided by the system without requiring direction by a user.

* * * * *